US010193980B2

(12) United States Patent
Baek et al.

(10) Patent No.: US 10,193,980 B2
(45) Date of Patent: Jan. 29, 2019

(54) COMMUNICATION METHOD BETWEEN TERMINALS AND TERMINAL

(71) Applicant: SAMSUNG ELECTRONICS CO., LTD., Suwon-si (KR)

(72) Inventors: Yun-sun Baek, Suwon-si (KR); Hyeon-mok Ko, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 148 days.

(21) Appl. No.: 15/193,832

(22) Filed: Jun. 27, 2016

(65) Prior Publication Data

US 2016/0381141 A1 Dec. 29, 2016

Related U.S. Application Data

(60) Provisional application No. 62/185,025, filed on Jun. 26, 2015.

(30) Foreign Application Priority Data

Sep. 22, 2015 (KR) .................. 10-2015-0133879

(51) Int. Cl.
*H04L 29/08* (2006.01)
*H04W 4/08* (2009.01)
*H04W 4/70* (2018.01)

(52) U.S. Cl.
CPC .............. *H04L 67/12* (2013.01); *H04W 4/08* (2013.01); *H04W 4/70* (2018.02)

(58) Field of Classification Search
CPC ....... H04W 4/005; H04W 4/08; H04W 88/02; H04L 67/12
See application file for complete search history.

(56) References Cited

U.S. PATENT DOCUMENTS 5,533,695 A * 7/1996 Heggestad .............. B61L 3/125
246/1 R
7,814,205 B2 10/2010 LoGalbo et al.
(Continued)

OTHER PUBLICATIONS

International Search Report dated Sep. 30, 2016 issued by International Searching Authority in counterpart International Application No. PCT/KR2016/006824 (PCT/ISA/210).
(Continued)

*Primary Examiner* — Edan Orgad
*Assistant Examiner* — Nourali Mansoury
(74) *Attorney, Agent, or Firm* — Sughrue Mion, PLLC

(57) ABSTRACT

The present disclosure relates to technologies for a sensor network, machine-to-machine (M2M) communications, or machine type communications (MTC), and Internet of things (IoT), and may be utilized in intelligent services, based on the above technologies, such as a smart home, a smart building, smart cities, smart cars or connected cars, smart grids, healthcare, smart electronics, advanced medical services, public safety network communications through fusion and convergence with conventional IT technologies and various industries. Data transmission control between a group of uncoordinated electronic devices in a computer network including the use of transmission authorization request messages and transmission authorization grant messages.

12 Claims, 23 Drawing Sheets

(56) References Cited

U.S. PATENT DOCUMENTS

| | | | |
|---|---|---|---|
| 2004/0038681 A1* | 2/2004 | Chun | H04L 1/188 455/436 |
| 2005/0130647 A1* | 6/2005 | Matsuda | G06F 3/1203 455/426.2 |
| 2006/0168262 A1* | 7/2006 | Frazer | H04L 29/06 709/230 |
| 2007/0060181 A1* | 3/2007 | Shen | H04W 4/08 455/518 |
| 2007/0173273 A1 | 7/2007 | Gogic | |
| 2009/0137263 A1 | 5/2009 | Abbate et al. | |
| 2009/0199009 A1 | 8/2009 | Chia et al. | |
| 2010/0075666 A1* | 3/2010 | Garner | H04M 1/7253 455/426.1 |
| 2010/0077026 A1* | 3/2010 | Watanabe | H04L 63/10 709/203 |
| 2011/0076991 A1* | 3/2011 | Mueck | H04L 1/0003 455/414.1 |
| 2011/0219430 A1* | 9/2011 | Kuz | H04L 63/0428 726/3 |
| 2011/0230237 A1 | 9/2011 | Nishio | |
| 2012/0028605 A1* | 2/2012 | Ishihara | H04M 1/7253 455/410 |
| 2012/0033679 A1* | 2/2012 | Horn | H04W 48/10 370/401 |
| 2012/0102131 A1* | 4/2012 | Lin | H04L 12/66 709/207 |
| 2012/0294199 A1 | 11/2012 | Anchan | |
| 2013/0155984 A1* | 6/2013 | Marinier | H04L 5/0007 370/329 |
| 2014/0066118 A1* | 3/2014 | Pai | H04W 4/10 455/518 |
| 2014/0143841 A1 | 5/2014 | Karaoguz et al. | |
| 2015/0163206 A1* | 6/2015 | McCarthy | G06F 21/6227 713/171 |

OTHER PUBLICATIONS

Written Opinion dated Sep. 30, 2016 issued by International Searching Authority in counterpart International Application No. PCT/KR2016/006824 (PCT/ISA/237).

Communication dated Mar. 26, 2018 issued by the European Patent Office in counterpart European Patent Application No. 16814767.6.

* cited by examiner

COMMUNICATION METHOD BETWEEN TERMINALS AND TERMINAL

CROSS-REFERENCE TO RELATED APPLICATIONS

This application claims the benefit of U.S. Provisional Application No. 62/185,025, filed on Jun. 26, 2015, in the US Patent Office and Korean Patent Application No. 10-2015-0133879, filed on Sep. 22, 2015, in the Korean Intellectual Property Office, the disclosures of which are incorporated herein in their entireties by reference.

BACKGROUND

1. Field

The present disclosure relates to a communication method between terminals and a terminal for performing communication, and a recording medium storing a program for executing the communication method between the terminals.

2. Description of the Related Art

The Internet is advancing from a connection network for humans, where a human creates and consumes information, to an Internet of things (IoT) network where distributed elements such as things exchange and process information. Internet of everything (IoE) technology, where big data processing technology and/or the like is combined with IoT technology through a connection with a cloud server, has been proposed. Technologies such as sensing technology, wired/wireless communication and network infrastructure, service interface technology, and security technology are required for implementing IoT. Therefore, technology such as sensor network, machine to machine (M2M), and machine type communication (MTC) are being recently researched for a connection between things.

An intelligent Internet technology (IT) service, which collects and analyzes data generated by things connected to each other to create a new value of human life, may be provided in an IoT environment. IoT may be applied to fields, such as smart home, smart building, smart city, smart car or connected car, smart grid, health care, smart appliances, advanced medical service, disaster network communication, and/or the like, through mergence and combination of conventional information technology (IT) technology and various industries.

SUMMARY

Provided is a communication method which, when communication is performed between a plurality of terminals, enables the terminals to distributively operate even without a terminal acting as a service.

Additional aspects will be set forth in part in the description which follows and, in part, will be apparent from the description, or may be learned by practice of the presented embodiments.

According to an aspect of an embodiment, a communication method between terminals includes: receiving, by a terminal, media data of a first terminal having a transmission authority among other terminals included in a group including the terminal; transmitting a transmission authority request message to each of the other terminals of the group; receiving a transmission authority request acceptance message from the first terminal; and determining whether the media data of the first terminal is received, and transmitting media data of the terminal.

The communication method may further include: retransmitting the transmission authority request message to the first terminal when the media data of the first terminal is not received for a certain time, wherein the transmitting of the media data of the terminal may include transmitting the media data of the terminal when the transmission authority request acceptance message is not re-received within a certain time after retransmitting the transmission authority request message.

The communication method may further include determining whether a priority of the terminal is highest in priorities of one or more terminals which have requested the transmission authority from the first terminal, wherein the retransmitting of the transmission authority request message may include retransmitting the transmission authority request message when the priority of the terminal is highest and the media data of the first terminal is not received for a certain time.

The transmission authority request acceptance message may include information about other terminals which have requested the transmission authority from the first terminal.

The communication method may further include: updating transmission authority status information about the terminal, based on the information about other terminals which have requested the transmission authority from the first terminal.

The transmitting of the media data may include, when a transmission release message is received from the first terminal, transmitting the media data to each of the other terminals of the group.

The communication method may further include: receiving the transmission release message from the first terminal; and determining whether a priority of the terminal is highest in priorities of one or more terminals requesting the transmission authority, wherein the transmitting of the media data may include, when the priority of the terminal is highest, transmitting the media data to each of the other terminals of the group.

According to an aspect of another embodiment, a communication method between terminals includes: transmitting, by a first terminal, media data to each of other terminals included in a group including the first terminal; receiving a transmission authority request message from at least one of the other terminals of the group; determining a transmission authority status of the at least one terminal, based on a priority of the at least one terminal; and transmitting a transmission authority request acceptance message, including information about the determined transmission authority status, to each of the other terminals of the group.

The communication method may further include obtaining, by a terminal having a highest priority among the at least one terminal, a transmission authority when the transmission of the media data of the first terminal is completed.

The communication method may further include obtaining, by a terminal having a highest priority among the at least one terminal, a transmission authority when the media data of the first terminal is not received for a certain time.

According to an aspect of another embodiment, a terminal includes: a communicator configured to receive media data of a first terminal having a transmission authority among other terminals included in a group including a terminal, transmit a transmission authority request message to each of the other terminals of the group, and receive a transmission authority request acceptance message from the first terminal; and a controller configured to determine whether the media data of the first terminal is received, wherein the communicator transmits media data of the terminal, based on a result of the determination.

When the media data of the first terminal is not received for a certain time, the communicator may retransmit the transmission authority request message to the first terminal, and when the transmission authority request acceptance message is not re-received within a certain time after retransmitting the transmission authority request message, the communicator may transmit the media data of the terminal.

The controller may determine whether a priority of the terminal is highest in priorities of one or more terminals which have requested the transmission authority from the first terminal, and when the priority of the terminal is highest and the media data of the first terminal is not received for a certain time, the communicator may retransmit the transmission authority request message.

The transmission authority request acceptance message may include information about other terminals which have requested the transmission authority from the first terminal.

The controller may update transmission authority status information about the terminal, based on the information about other terminals which have requested the transmission authority from the first terminal.

When a transmission release message is received from the first terminal, the communicator may transmit the media data to each of the other terminals of the group.

The communicator may receive the transmission release message from the first terminal, and when a priority of the terminal is highest in priorities of one or more terminals requesting the transmission authority, the communicator may transmit the media data to each of the other terminals of the group.

According to an aspect of another embodiment, a first terminal includes: a communicator configured to transmit media data to each of other terminals included in a group including the first terminal and receive a transmission authority request message from at least one of the other terminals of the group; and a controller configured to determine a transmission authority status of the at least one terminal, based on a priority of the at least one terminal, wherein the communicator transmits a transmission authority request acceptance message, including information about the determined transmission authority status, to each of the other terminals of the group.

When the transmission of the media data of the first terminal is completed, a terminal having a highest priority among the at least one terminal may obtain a transmission authority.

When the media data of the first terminal is not received for a certain time, a terminal having a highest priority among the at least one terminal may obtain a transmission authority.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
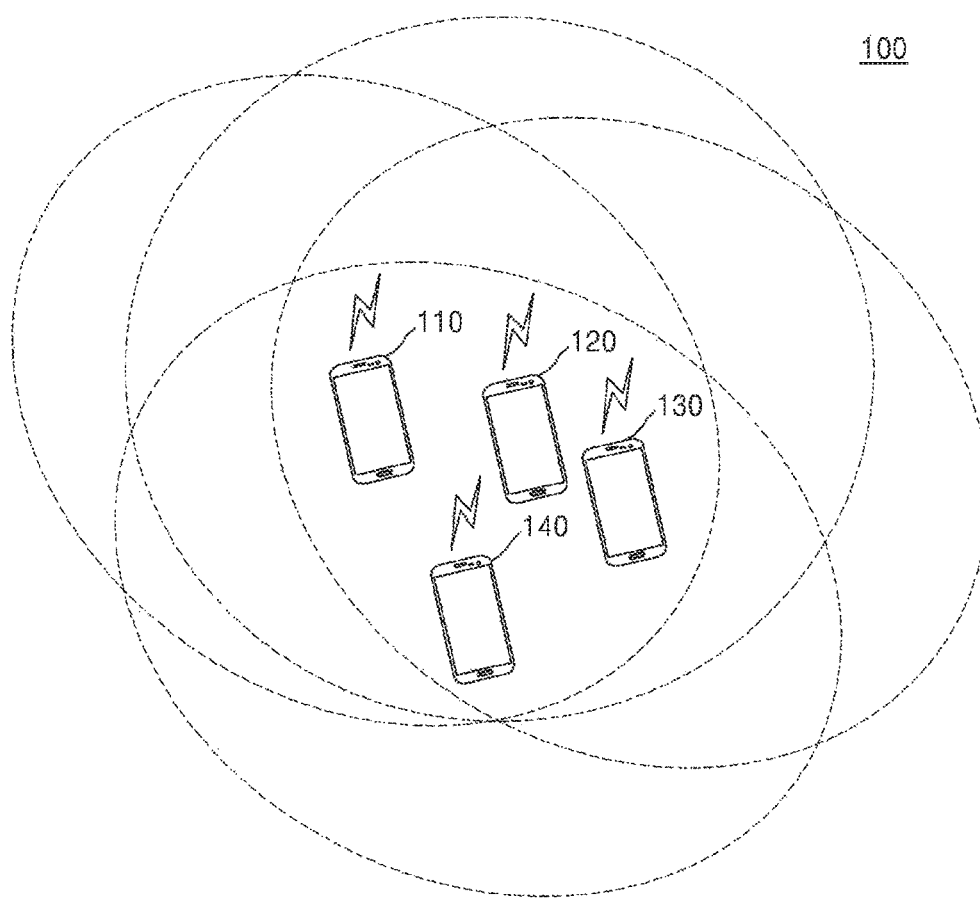
FIG. 1 is a diagram for describing a communication system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of" when preceding a list of elements, modify the entire list of elements and do not modify the individual elements of the list.

Terms used herein will be briefly described, and the inventive concept will be described in detail.

Terms used in the inventive concept have been selected as general terms which are widely used at present, in consideration of the functions of the inventive concept, but may be altered according to the intent of an operator of ordinary skill in the art, conventional practice, or introduction of new technology. Also, if there is a term which is arbitrarily selected by the applicant in a specific case, in which case a meaning of the term will be described in detail in a corresponding description portion of the inventive concept. Therefore, the terms should be defined on the basis of the entire content of this specification instead of a simple name of each of the terms.

In this disclosure below, when it is described that one comprises (or includes or In this disclosure below, when it is described that one comprises (or includes or has) some elements, it should be understood that it may comprise (or include or has) only those elements, or it may comprise (or include or have) other elements as well as those elements if there is no specific limitation. Moreover, each of terms such as " . . . unit", " . . . apparatus" and "module" described in specification denotes an element for performing at least one function or operation, and may be implemented in hardware, software or the combination of hardware and software.

Hereinafter, exemplary embodiments will be described in detail to be easily embodied by those of ordinary skill in the art with reference to the accompanying drawings. The inventive concept may, however, be embodied in many different forms and should not be construed as being limited to the embodiments set forth herein. In the accompanying drawings, a portion irrelevant to a description of the inventive concept will be omitted for clarity. Moreover, like reference numerals refer to like elements throughout.

FIG. 1 is a diagram for describing a communication system 100 according to an embodiment.

The communication system 100 according to an embodiment may include a plurality of terminals 110, 120, 130 and 140.

The communication system 100 of FIG. 1 is illustrated as including only elements associated with the present embodiment. Therefore, it may be understood by one of ordinary skill in the art that the communication system 100 may further include general-use elements in addition to the elements of FIG. 1. For example, the communication system 100 of FIG. 1 may further include other terminals in addition to the plurality of terminals 110, 120, 130 and 140. In the communication system 100, a session for transmitting or receiving data may be set between the plurality of terminals 110, 120, 130 and 140. Here, the plurality of terminals 110, 120, 130 and 140 may be terminals included in one group of at least one group which is previously provided in the communication system 100.

Referring to FIG. 1, when the plurality of terminals 110, 120, 130 and 140 included in a group are located within different communication ranges, the plurality of terminals 110, 120, 130 and 140 may directly transmit or receive data. For example, each of the terminals 110, 120, 130 and 140 of the group may transmit or receive media data and control data such as a transmission authority request message, a transmission authority acceptance message, a transmission release message, and a transmission authority request acceptance message according to a multicast method. However, this is merely an embodiment, and a communication method between the terminals 110, 120, 130 and 140 of the group is not limited to the multicast method.

Even when there is no server which is previously provided, the communication system 100 according to an embodiment may process a transmission authority request of at least one terminal of the group. For example, at least one terminal desiring to transmit media data among the plurality of terminals 110, 120, 130 and 140 may request a transmission authority from other terminals of the group and may receive a response to the request to obtain the transmission authority.

Moreover, in a state where there is no server which is previously provided, when a plurality of terminals request a transmission authority and thus a competition condition is provided, the communication system 100 according to an embodiment may determine a terminal having the transmission authority. For example, when two or more terminals request the transmission authority, the communication system 100 according to an embodiment may determine a terminal having the transmission authority, based on a predetermined priority or a random value which is generated in each of the terminals of the group.

According to another embodiment, when there is a terminal which is transmitting media data, the communication system 100 may process a transmission authority request received from another terminal. For example, when one of the terminals 110, 120, 130 and 140 of the group receives a transmission authority request from another terminal in the middle of transmitting media data, the transmission of the media data may be completed, and then, a transmission authority may be delegated to the other terminal. As another example, a terminal which is transmitting media data may compare priorities or random values of other terminals which has transmitted a transmission authority request message, and may delegate a transmission authority to a corresponding terminal, based on a result of the comparison.

In the communication system 100 according to an embodiment, when a terminal having a transmission authority is absent from a certain position, other terminals included in a group may recognize an absence state of the terminal having the transmission authority and may quickly delegate the transmission authority to another terminal. Here, a case where the terminal having the transmission authority is absent from a certain position may include a case where a battery has been discharged, a case of deviating from direct communication coverage, and/or the like. However, this is merely an embodiment, and a case where a terminal is absent from a certain position is not limited thereto.

Figure 2:
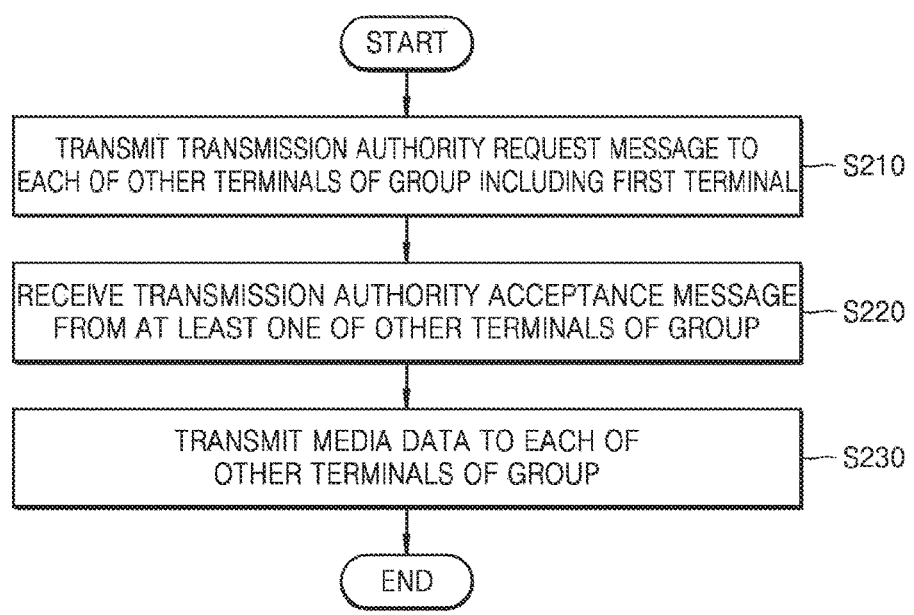
FIG. 2 is a flowchart for describing a method of obtaining, by a first terminal of a plurality of terminals in a group, a transmission authority according to an embodiment.

FIG. 2 is a flowchart for describing a method of obtaining, by a first terminal 110 of a plurality of terminals 110, 120, 130 and 140 in a group, a transmission authority according to an embodiment.

In operation S210, the first terminal 110 may transmit a transmission authority request message to each of the other terminals 120, 130 and 140 of the group including the first terminal 110.

Each of the terminals 110, 120, 130 and 140 of the group according to an embodiment may request a transmission authority, for transmitting media data to the other terminals. For example, the first terminal 110 may transmit a transmission authority request message to each of the other terminals 120, 130 and 140 of the group, for transmitting the media data of the first terminal 110.

Moreover, the first terminal 110 according to an embodiment may monitor whether there is another terminal requesting the transmission authority, for a certain time before transmitting the transmission authority request message. When the transmission authority request message is not received from the other terminal for the certain time as a result of the monitoring, the first terminal 110 may transmit the transmission authority request message of the first terminal 110 to each of the other terminals 120, 130 and 140 of the group.

In operation S220, when a standby time which is randomly determined in each of the other terminals 120, 130 and 140 of the group elapses, the first terminal 110 may receive a transmission authority acceptance message from at least one of the other terminals 120, 130 and 140 of the group.

When there is no terminal requesting the transmission authority among the other terminals 120, 130 and 140 of the group, the first terminal 110 according to an embodiment may receive the transmission authority acceptance message from at least one of the other terminals 120, 130 and 140 of the group.

According to another embodiment, when there is another terminal requesting the transmission authority in addition to the first terminal 110, the first terminal 110 may receive the transmission authority acceptance message according to a competition condition. For example, when the transmission authority request message is transmitted from another terminal before or after a certain time from a time when the first terminal 110 transmits the transmission authority request message, the first terminal 110 may not receive the transmission authority request message from the other terminal during a monitoring period, and thus, a competition may occur between the first terminal 110 and other terminals. A case where a competition occurs will be described below in detail with reference to FIG. 5.

Moreover, another terminal (for example, 130) of the group receiving the transmission authority request message from the first terminal 110 may monitor whether another transmission authority request message is received for a certain time from a time when the transmission authority request message is received. Here, the certain time may be, for example, 1 round trip time (1RTT). When the other transmission authority request message is not received, the transmission authority acceptance message may be transmitted to the first terminal 110.

Moreover, when the other transmission authority request message is not received for a certain time, each of the other terminals 120, 130 and 140 of the group may transmit the transmission authority acceptance message after a standby time which is randomly determined in each terminal elapses. Also, in order to prevent a network resource from being wasted, when a terminal (for example, 120) receives the transmission authority acceptance message including the same information from another terminal (for example, 130), the terminal (for example, 120) may not transmit the transmission authority acceptance message. Here, for example, when a standby time of the other terminal (for example, 130) elapses first and thus the transmission authority acceptance message has been already transmitted, the terminal (for example, 120) may not transmit the transmission authority acceptance message.

For example, among second to fourth terminals 120, 130 and 140, the third terminal 130 where a randomly determined standby time elapses first may transmit the transmission authority acceptance message, indicating that a transmission authority of the first terminal 110 is accepted, to each of the first terminal 110, the second terminal 120, and the fourth terminal 140 when the transmission authority acceptance message is not received from the other terminals 120 and 140.

In operation S230, the first terminal 110 may transmit the media data to each of the other terminals 120, 130 and 140 of the group.

When the transmission authority acceptance message is received from one terminal, where the standby time elapses first, among the other terminals 120, 130 and 140 of the group, the first terminal 110 according to an embodiment may transmit the media data to each of the other terminals 120, 130 and 140 of the group.

Figure 3:
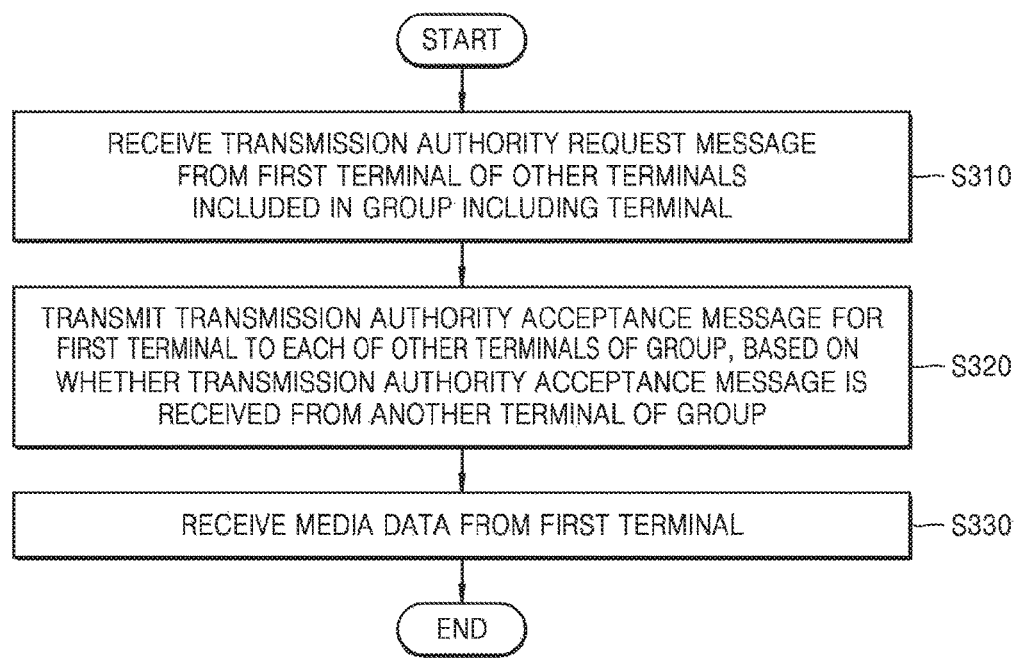
FIG. 3 is a flowchart for describing a method of determining, by one of a plurality of terminals in a group, a terminal having a transmission authority according to an embodiment.

FIG. 3 is a flowchart for describing a method of determining, by one of a plurality of terminals 110, 120, 130 and 140 in a group, a terminal having a transmission authority according to an embodiment.

In operation S310, a terminal (for example, 120) may receive a transmission authority request message from a first terminal 110 of other terminals included in the group including the terminal (for example, 120).

In operation S320, the terminal (for example, 120) may transmit a transmission authority acceptance message for the first terminal 110 to each of the other terminals of the group, based on whether the transmission authority acceptance message is received from another terminal of the group.

The terminal (for example, 120) according to an embodiment may monitor whether a transmission authority request message of another terminal (for example, 130) is received for a certain time after a time when the transmission authority request message is received from the first terminal 110. For example, the terminal (for example, 120) may monitor whether the transmission authority request message of the other terminal (for example, 130) is received for 1RTT after the time when the transmission authority request message is received from the first terminal 110.

If the transmission authority request message of the other terminal (for example, 130) is not received for the certain time after the time when the transmission authority request message is received from the first terminal 110, the terminal (for example, 120) according to an embodiment may determine the first terminal 110 as a terminal having a transmission authority.

According to another embodiment, if the transmission authority request message of the other terminal (for example, 130) is received for the certain time after the time when the transmission authority request message is received from the first terminal 110, the terminal (for example, 120) may compare priorities or random values of other terminals transmitting a transmission authority request message according to a competition condition to determine a terminal having a transmission authority. This will be described below in detail with reference to FIG. 5.

The terminal (for example, 120) according to an embodiment may randomly generate a value of a standby time for transmitting a transmission authority acceptance message. The terminal (for example, 120) may transmit the transmission authority acceptance message to the other terminals 110, 130 and 140 of the group when a standby time, which is started after a certain time elapses from a time when the transmission authority request message is received from the first terminal 110, elapses.

Moreover, when the transmission authority acceptance message for the first terminal 110 is received from another terminal before the standby time elapses, the terminal (for example, 120) according to an embodiment may not transmit the transmission authority acceptance message so as to prevent a network resource from being unnecessarily used.

When information included in the transmission authority acceptance message received from the other terminal differs from information included in the transmission authority acceptance message of the terminal (for example, 120), the terminal (for example, 120) may transmit the transmission authority acceptance message. For example, when a plurality of terminals (for example, 110 and 130) in the group request the transmission authority, a terminal having the transmission authority determined by the terminal (for example, 120) may differ from a terminal having the transmission authority determined by another terminal (for example, 140). In this case, due to a network state, the transmission authority request messages of some terminals may be deleted.

In operation S330, the terminal (for example, 120) may receive media data from the first terminal 110. The terminal (for example, 120) according to an embodiment may receive the media data from the first terminal 110 which has obtained the transmission authority.

Figure 4:
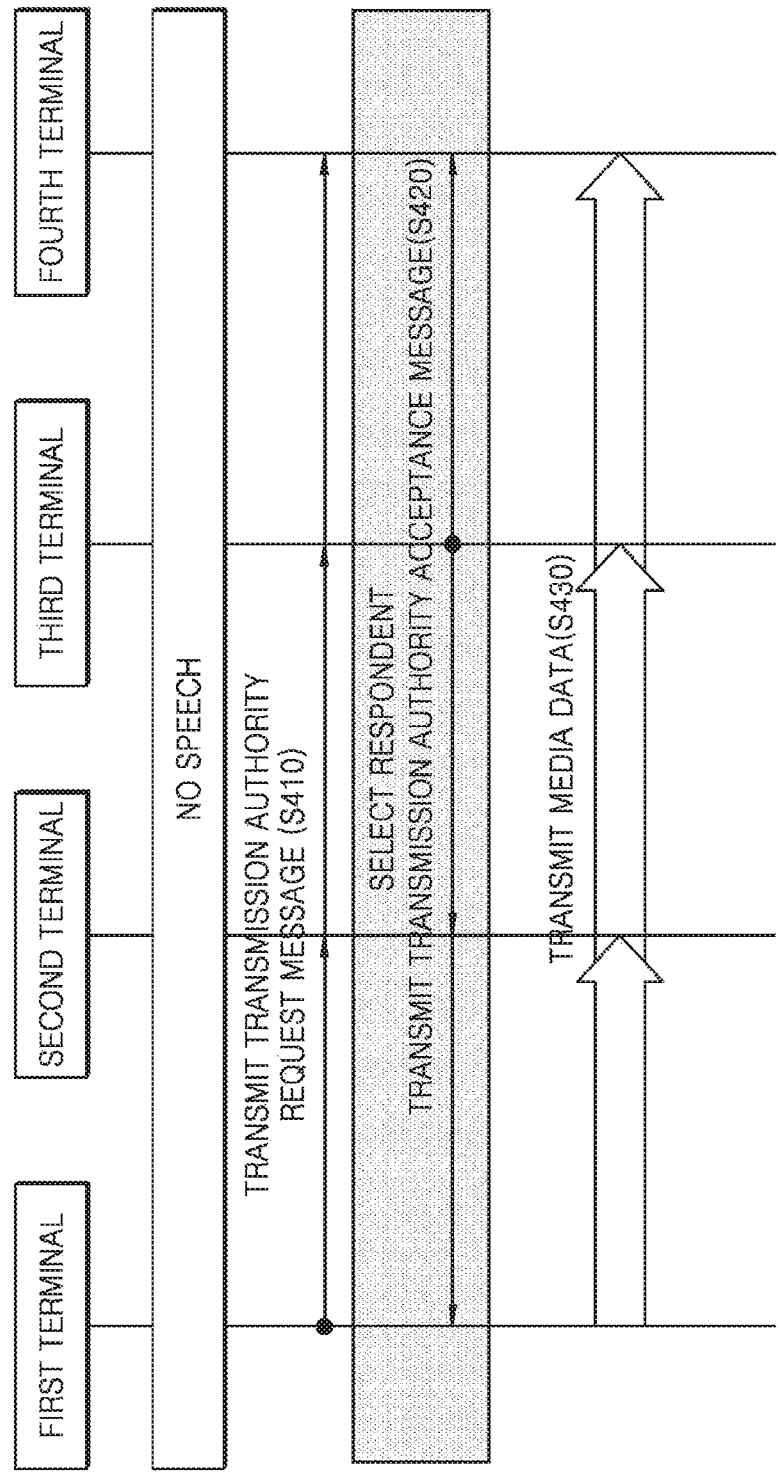
FIG. 4 is a flowchart for describing a method of obtaining, by a first terminal, a transmission authority when there is no terminal transmitting media data in a communication system, according to an embodiment.

FIG. 4 is a flowchart for describing a method of obtaining, by a first terminal 110, a transmission authority when there is no terminal transmitting media data in a communication system 100, according to an embodiment.

In operation S410, the first terminal 110 may transmit a transmission authority request message to each of other terminals 120, 130 and 140 included in a group when data is not received from another terminal for a certain time.

In operation S420, a third terminal 130 may transmit a transmission authority acceptance message for the first terminal 110 to the first terminal 110, a second terminal 120, and a fourth terminal 140.

According to an embodiment, each of the second terminal 120, the third terminal 130, and the fourth terminal 140 which have received the transmission authority request message of the first terminal 110 may determine a terminal having a transmission authority. In FIG. 4, it is assumed that another transmission authority request message is not received for a certain time after a time when the transmission authority request message of the first terminal 110 is received by each of the second terminal 120, the third terminal 130, and the fourth terminal 140.

According to an embodiment, each of the second terminal 120, the third terminal 130, and the fourth terminal 140 may randomly generate a value of a standby time. Each of the second terminal 120, the third terminal 130, and the fourth terminal 140 may monitor whether a transmission authority acceptance message for the first terminal 110 is received for the standby time.

According to an embodiment, when the transmission authority acceptance message is not received from the second terminal 120 and the fourth terminal 140 for the standby time, the third terminal 130 where the standby time elapses first may be selected as a respondent. The third terminal 130 may transmit the transmission authority acceptance message for the first terminal 110 to the first terminal 110, the second terminal 120, and the fourth terminal 140.

In operation S430, when the transmission authority acceptance message is received from the third terminal 130, the first terminal 110 may transmit media data to each of the second terminal 120, the third terminal 130, and the fourth terminal 140.

Figure 5:
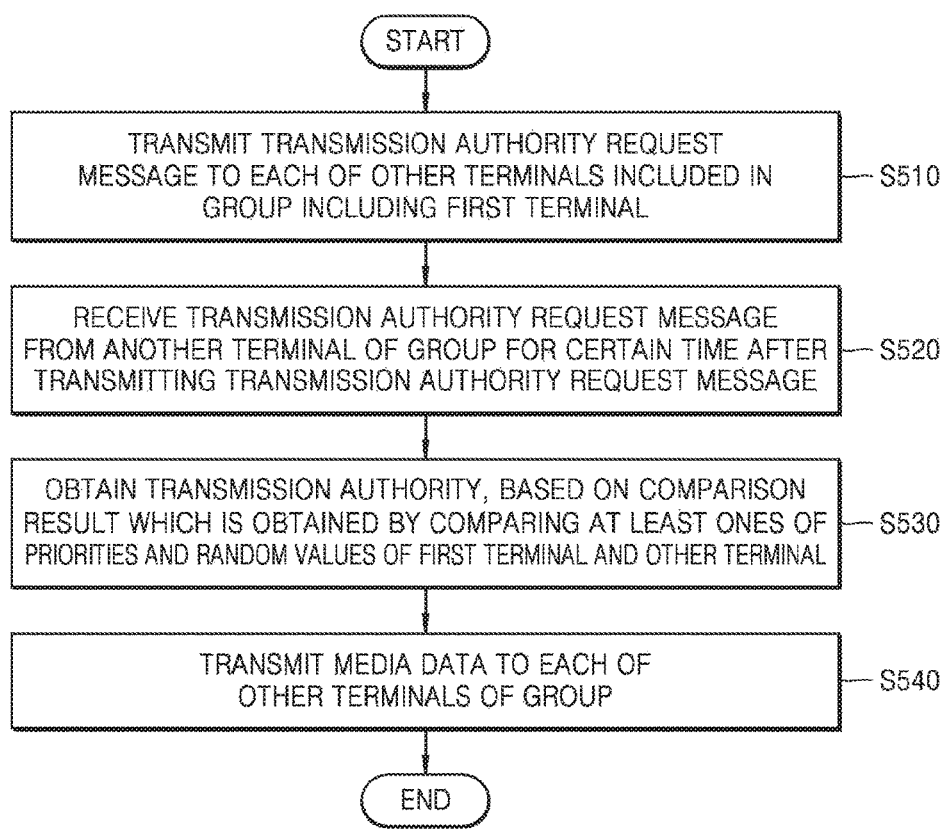
FIG. 5 is a flowchart for describing a method of determining a first terminal as a terminal having a transmission authority when a competition for the transmission authority occurs in a communication system, according to an embodiment.

FIG. 5 is a flowchart for describing a method of determining a first terminal 110 as a terminal having a transmission authority when a competition for the transmission authority occurs in a communication system 100, according to an embodiment.

In operation S510, the first terminal 110 may transmit a transmission authority request message to each of other terminals 120, 130 and 140 included in a group including the first terminal 110.

Moreover, operation S510 may correspond to the above-described operation S210.

In operation S520, the first terminal 110 may receive the transmission authority request message from another terminal (for example, 140) of the group for a certain time after transmitting the transmission authority request message.

For example, the first terminal 110 may receive the transmission authority request message from a fourth terminal 140 for 1RTT after transmitting the transmission authority request message.

In operation S530, the first terminal 110 may obtain a transmission authority, based on a comparison result which is obtained by comparing at least ones of priorities and random values of the first terminal 110 and the other terminal (for example, 140).

In the communication system 100 according to an embodiment, when the transmission authority request message is generated from a plurality of terminals 110 and 140, a terminal having the transmission authority may be determined based on at least ones of priorities and random values of the plurality of terminals 110 and 140.

For example, the first terminal 110 may have a highest priority of priorities of the terminals included in the group. Here, the priorities may be previously set between the terminals of the group. Therefore, the first terminal 110 of the first terminal 110 and a fourth terminal 140 may be determined as a terminal having a transmission authority.

According to another embodiment, a random value generated from the first terminal 110 may be added into the transmission authority request message of the first terminal 110, and a random value generated from the fourth terminal 140 may be added into the transmission authority request message of the fourth terminal 140. When the random value of the first terminal 110 is greater than that of the fourth terminal 140, the first terminal 110 may be determined as a terminal having a transmission authority. However, this is merely an embodiment, and a terminal having a smaller random value may be determined as a terminal having a transmission authority according to a setting.

In operation S540, the first terminal 110 may transmit media data to each of the other terminals 120, 130 and 140 of the group.

Moreover, operation S540 may correspond to the above-described operation S230.

Figure 6:
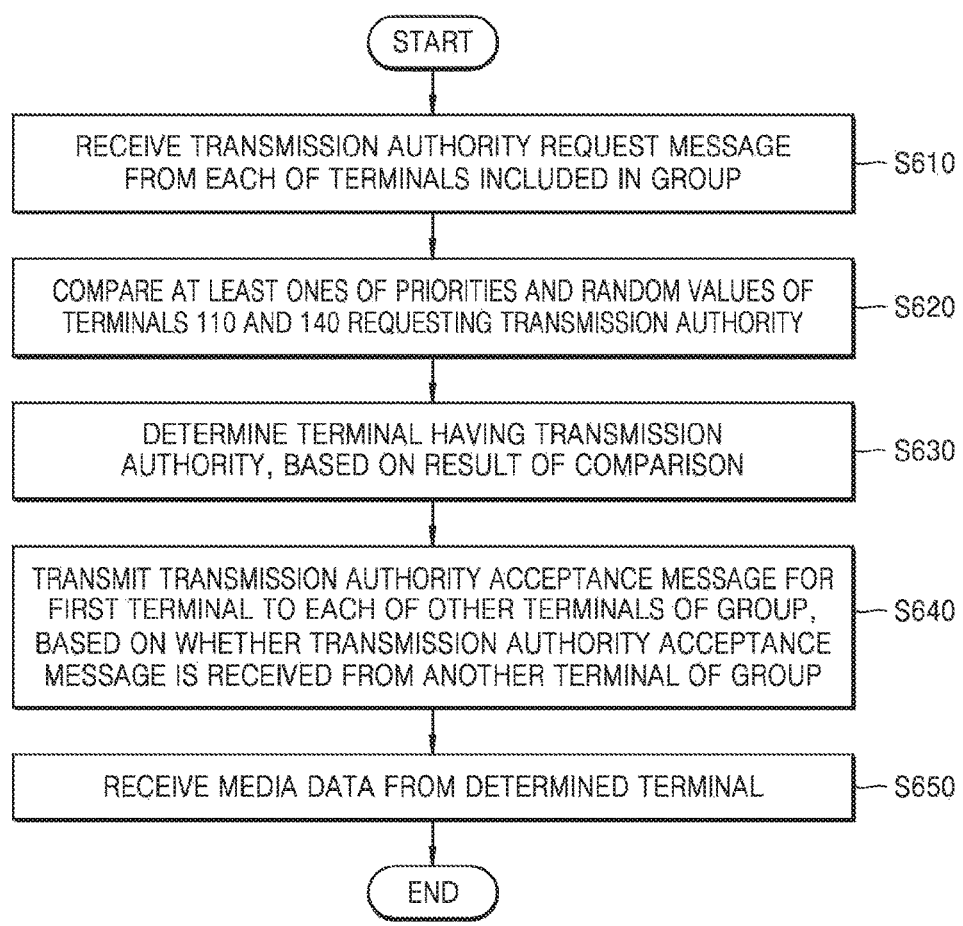
FIG. 6 is a flowchart for describing a method of determining, by a terminal, a terminal having a transmission authority when a competition for the transmission authority occurs in a communication system, according to an embodiment.

FIG. 6 is a flowchart for describing a method of determining, by a terminal (for example 120), a terminal having a transmission authority when a competition for the transmission authority occurs in a communication system 100, according to an embodiment.

In operation S610, a terminal (for example, 120) may receive a transmission authority request message from each of a plurality of terminals 110 and 140 included in a group.

For example, the terminal (for example, 120) may receive the transmission authority request message of a fourth terminal 140 within a certain time from a time when the transmission authority request message of a first terminal 110 is received. However, this is merely an embodiment, and the terminal (for example, 120) may receive the transmission authority request message of the first terminal 110 within a certain time from a time when the transmission authority request message of the fourth terminal 140 is received.

In operation S620, the terminal (for example, 120) may compare at least ones of priorities and random values of the plurality of terminals 110 and 140 requesting a transmission authority. The terminal (for example, 120) according to an embodiment may compare priorities of the first and fourth terminals 110 and 140 which have requested the transmission authority. According to another embodiment, when priorities of the first and fourth terminals 110 and 140 are equal, the terminal (for example, 120) may compare random values which are respectively generated from the first and fourth terminals 110 and 140. According to another embodiment, when there is no predetermined priority between a plurality of terminals 110, 120, 130 and 140 included in the group, the terminal (for example, 120) may compare the random values which are respectively generated from the first and fourth terminals 110 and 140.

In operation S630, the terminal (for example, 120) may determine a terminal having the transmission authority, based on a result of the comparison.

The terminal (for example, 120) according to an embodiment may compare the priorities of the first and fourth terminals 110 and 140 requesting the transmission authority to determine a terminal having the transmission authority. The terminal (for example, 120) may determine the first terminal 110 having a higher priority as a terminal having the transmission authority.

When the priorities of the first and fourth terminals 110 and 140 are equal, the terminal (for example, 120) according to an embodiment may compare the random values respectively generated from the first and fourth terminals 110 and 140 to determine a terminal having the transmission authority. The terminal (for example, 120) may determine the first terminal 110 having a greater random value as the terminal having the transmission authority. However, a terminal having a smaller random value may be determined as the terminal having the transmission authority according to a setting.

According to another embodiment, when there is no predetermined priority between the plurality of terminals 110, 120, 130 and 140 included in the group, the terminal (for example, 120) may determine the first terminal 110, having a greater random value among the first and fourth terminals 110 and 140, as the terminal having the transmission authority. However, a terminal having a smaller random value may be determined as the terminal having the transmission authority according to a setting.

In operation S640, the terminal (for example, 120) may transmit a transmission authority acceptance message for the first terminal 110 to each of the other terminals of the group, based on whether the transmission authority acceptance message is received from another terminal of the group.

Moreover, operation S640 may correspond to operation S320 described above with reference to FIG. 3.

In operation S650, the terminal (for example, 120) may receive media data from the determined terminal.

For example, when the first terminal 110 is determined as the terminal having the transmission authority, the terminal (for example, 120) may receive the media data from the first terminal 110.

Figure 7:
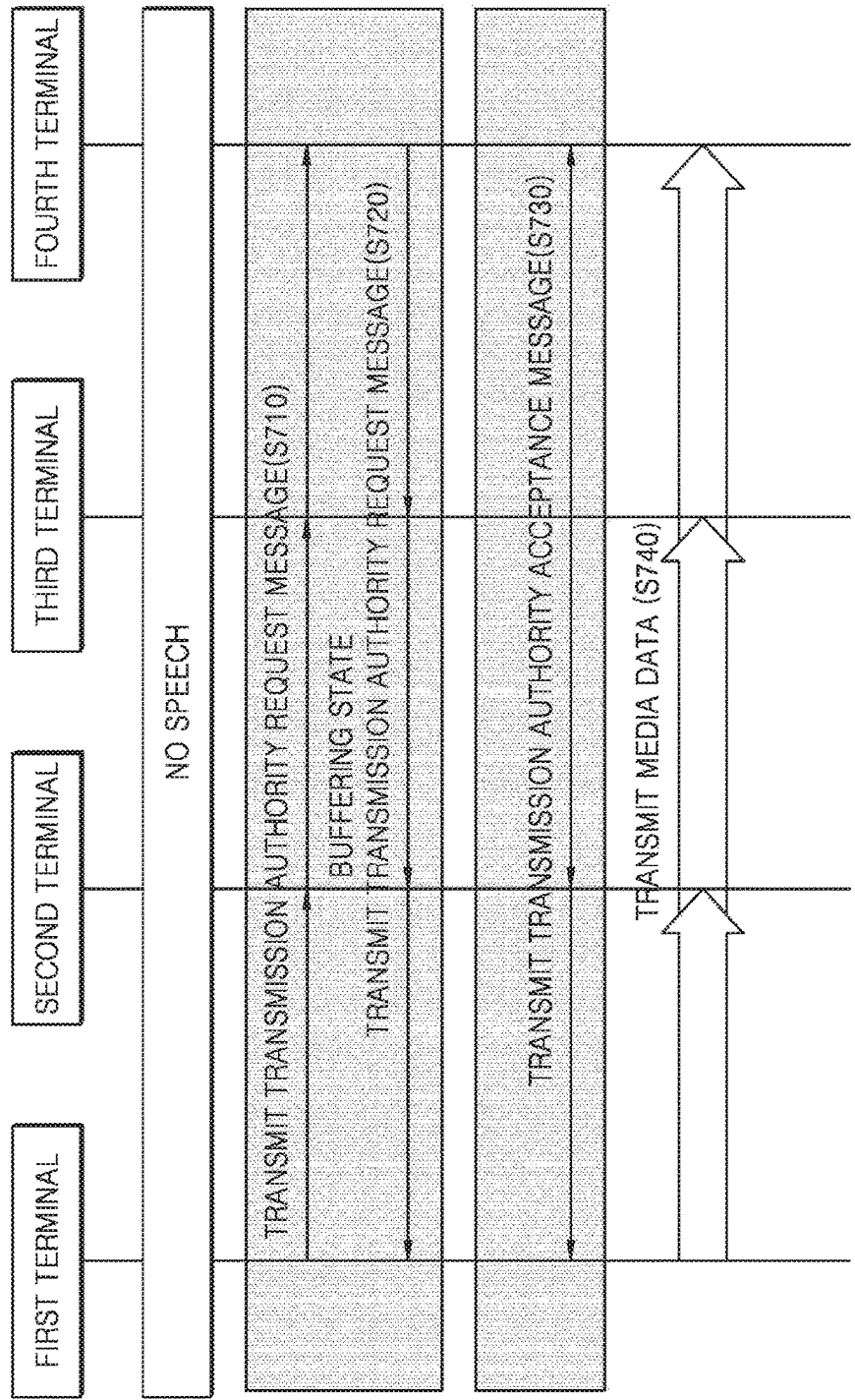
FIG. 7 is a flowchart for describing a method of determining a terminal having a transmission authority when a competition for the transmission authority occurs in a communication system, according to an embodiment.

FIG. 7 is a flowchart for describing a method of determining a terminal having a transmission authority when a competition for the transmission authority occurs in a communication system 100, according to an embodiment.

In operation S710, when data is not received from another terminal for a certain time, a first terminal 110 may transmit a transmission authority request message to each of a plurality of terminals 120, 130 and 140 included in a group.

In operation S720, when data is not received from another terminal for a certain time, a fourth terminal 140 may transmit the transmission authority request message to each of the plurality of terminals 110, 120 and 130 included in the group.

Moreover, the fourth terminal 140 cannot receive, for a certain time, the transmission authority request message of the first terminal 110 which is transmitted in operation S710, based on a distance to the first terminal 110 and a network state between the first and fourth terminals 110 and 140.

In operation S730, a third terminal 130 may transmit a transmission authority acceptance message for the first terminal 110 to the first terminal 110, a second terminal 120, and the fourth terminal 140.

The second and third terminals 120 and 130 according to an embodiment may receive the transmission authority request message of the fourth terminal 140 within a certain time from a time when the transmission authority request message of the first terminal 110 is received. Also, the first terminal 110 may receive the transmission authority request message of the fourth terminal 140 within a certain time from a time when the transmission authority request message of the first terminal 110 is transmitted.

Each of the terminals 110, 120, 130 and 140 of the group may determine a terminal having a transmission authority, based on at least ones of priorities and random values of the terminals 110 and 140 requesting the transmission authority.

For example, the third terminal 130 may determine the first terminal 110, having a higher priority among the first and fourth terminals 110 and 140, as the terminal having the transmission authority. As another example, when priorities of the first and fourth terminals 110 and 140 are equal, the third terminal 130 may compare random values respectively generated from the first and fourth terminals 110 and 140 to determine the first terminal 110 having a greater random value as the terminal having the transmission authority.

According to another embodiment, when there is no predetermined priority between the plurality of terminals 110, 120, 130 and 140 included in the group, the third terminal 130 may compare the random values respectively generated from the first and fourth terminals 110 and 140 to determine the first terminal 110 having a greater random value as the terminal having the transmission authority.

Moreover, each of the first terminal 110, the second terminal 120, and the fourth terminal 140 may compare at least ones of the priorities and random values of the first and fourth terminals 110 and 140 requesting the transmission authority to determine the terminal having the transmission authority.

According to an embodiment, each of the first to fourth terminals 110, 120, 130 and 140 may randomly generate a value of a standby time. Each of the first to fourth terminals 110, 120, 130 and 140 may monitor whether a transmission authority acceptance message for the first terminal 110 is received for the standby time.

According to an embodiment, when the transmission authority acceptance message is not received from the first terminal 110, the second terminal 120, and the fourth terminal 140 for the standby time, the third terminal 130 where the standby time elapses first may be selected as a respondent. The third terminal 130 may transmit the transmission authority acceptance message for the first terminal 110 to each of the first terminal 110, the second terminal 120, and the fourth terminal 140.

In operation S740, when the transmission authority acceptance message is received from the third terminal 130, the first terminal 110 may transmit media data to each of the second terminal 120, the third terminal 130, and the fourth terminal 140.

Figure 8:
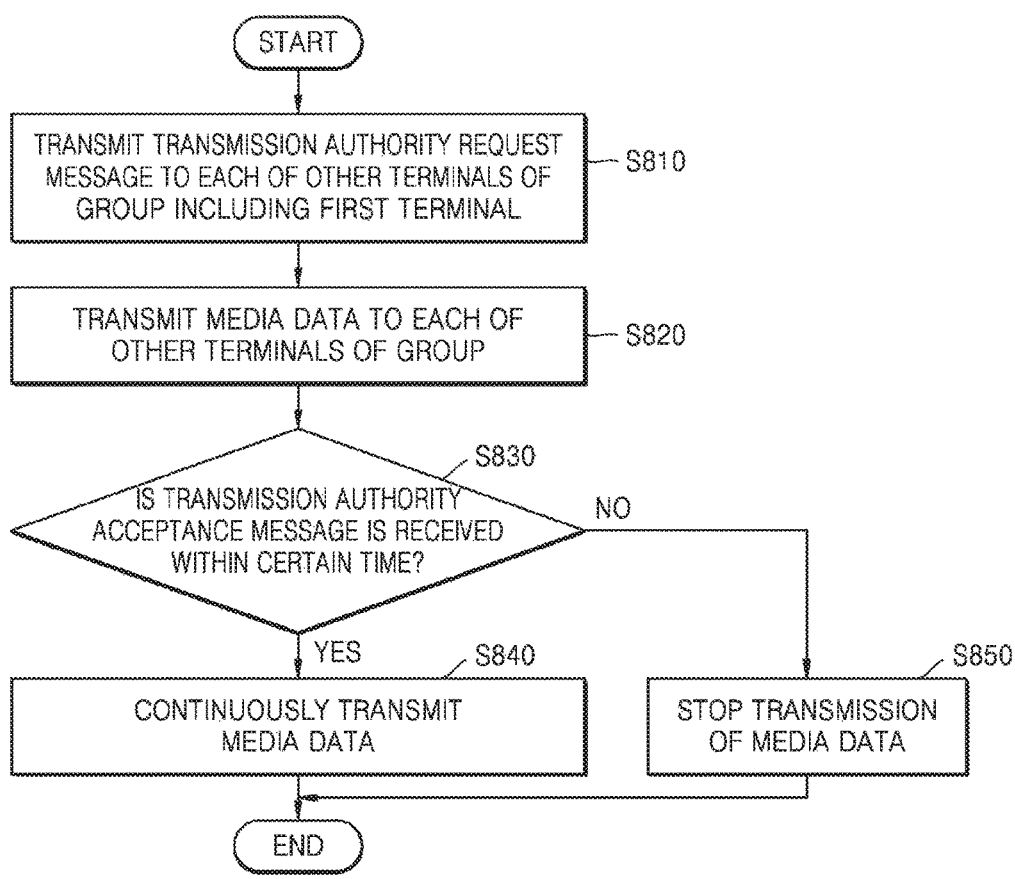
FIG. 8 is a flowchart for describing a method of obtaining, by a first terminal of a plurality of terminals in a group, a transmission authority according to another embodiment.

FIG. 8 is a flowchart for describing a method of obtaining, by a first terminal 110 of a plurality of terminals 110, 120, 130 and 140 in a group, a transmission authority according to another embodiment.

In operation S810, the first terminal 110 may transmit a transmission authority request message to each of the other terminals 120, 130 and 140 of the group including the first terminal 110.

The first terminal 110 according to an embodiment may monitor whether there is another terminal requesting a transmission authority for a certain time before transmitting the transmission authority request message. When the transmission authority request message is not received from the other terminal for the certain time as a result of the monitoring, the first terminal 110 may transmit the transmission authority request message of the first terminal 110 to each of the other terminals 120, 130 and 140 of the group.

In operation S820, the first terminal 110 may transmit media data to each of the other terminals 120, 130 and 140 of the group.

The first terminal 110 according to an embodiment may transmit the media data after transmitting the transmission authority request message to each of the other terminals 120, 130 and 140 of the group. After transmitting the transmission authority request message, the first terminal 110 may transmit the media data without waiting for reception of a transmission authority acceptance message from the other terminals 120, 130 and 140 of the group.

In operation S830, the first terminal 110 may determine whether the transmission authority acceptance message is received from at least one of the other terminals 120, 130 and 140 of the group within a certain time.

In operation S840, when the transmission authority acceptance message is received from at least one of the other terminals 120, 130 and 140 of the group within the certain time, the first terminal 110 may continuously transmit the media data.

In operation S850, when the transmission authority acceptance message is not received from at least one of the other terminals 120, 130 and 140 of the group within the certain time, the first terminal 110 may stop transmission of the media data.

Figure 9:
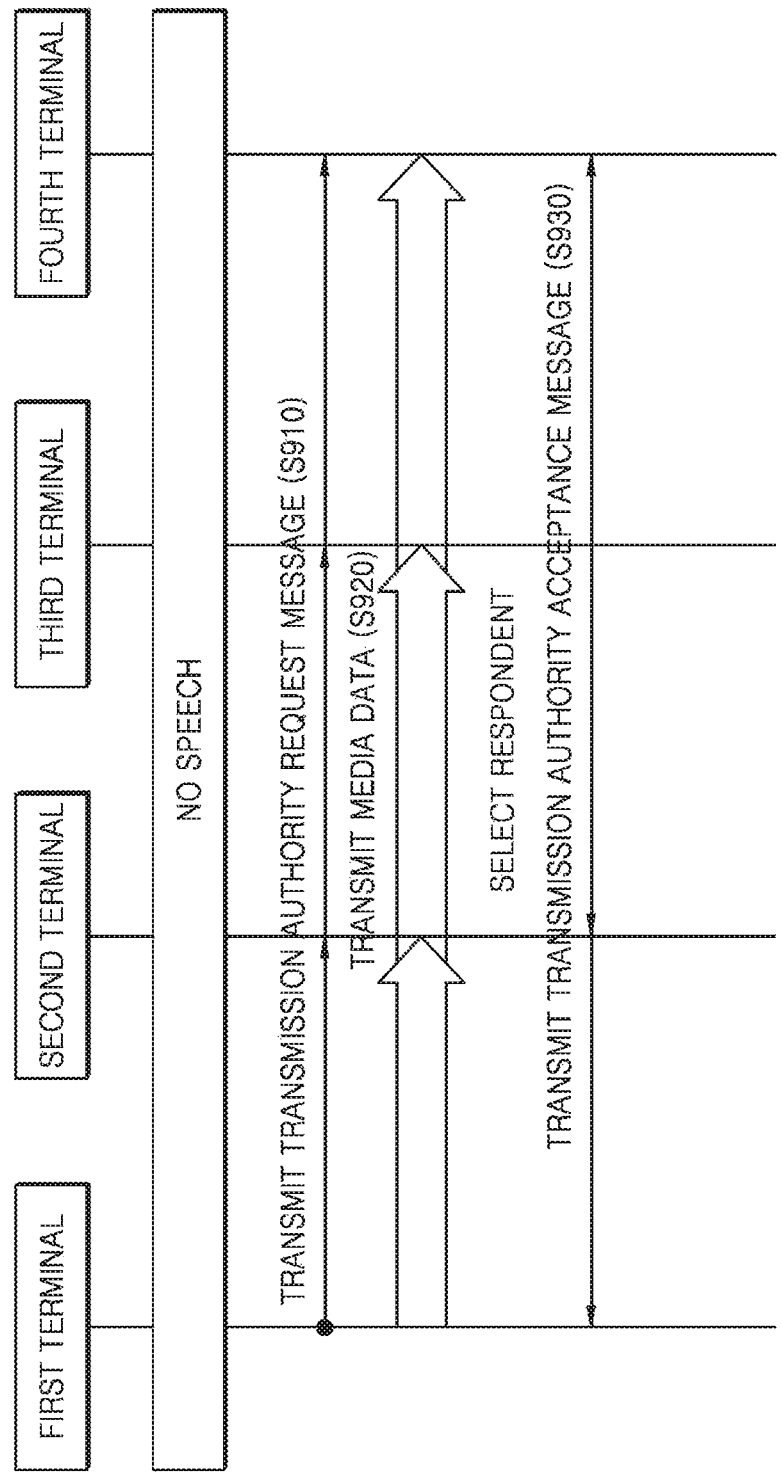
FIG. 9 is a flowchart for describing a method of determining a terminal having a transmission authority among a plurality of terminals in a group in a communication system, according to another embodiment.

FIG. 9 is a flowchart for describing a method of determining a terminal having a transmission authority among a plurality of terminals 110, 120, 130 and 140 in a group in a communication system 100, according to another embodiment.

In operation S910, when data is not received from another terminal for a certain time, a first terminal 110 may transmit a transmission authority request message to each of the other terminals 120, 130 and 140 of the group.

In operation S920, the first terminal 110 may transmit media data to each of the other terminals 120, 130 and 140 of the group.

After transmitting the transmission authority request message, the first terminal 110 may transmit the media data without waiting for reception of a transmission authority acceptance message from the other terminals 120, 130 and 140 of the group.

In operation S930, a third first terminal 110 may transmit a transmission authority acceptance message for the first terminal 110 to each of the first terminal 110, a second terminal 120, and a fourth terminal 140. Here, the third terminal 130 may be a terminal where a standby time determined based on a randomly generated value elapses first, and when the transmission authority acceptance message is not received from the second terminal 120 and the fourth terminal 140 for the standby time, the third terminal 130 may be selected as a respondent. The third terminal 130 may transmit the transmission authority acceptance message for the first terminal 110 to each of the first terminal 110, the second terminal 120, and the fourth terminal 140.

Moreover, when the transmission authority acceptance message is received from the third terminal 130 within a certain time, the first terminal 110 according to an embodiment may continuously transmit the media data.

Figure 10:
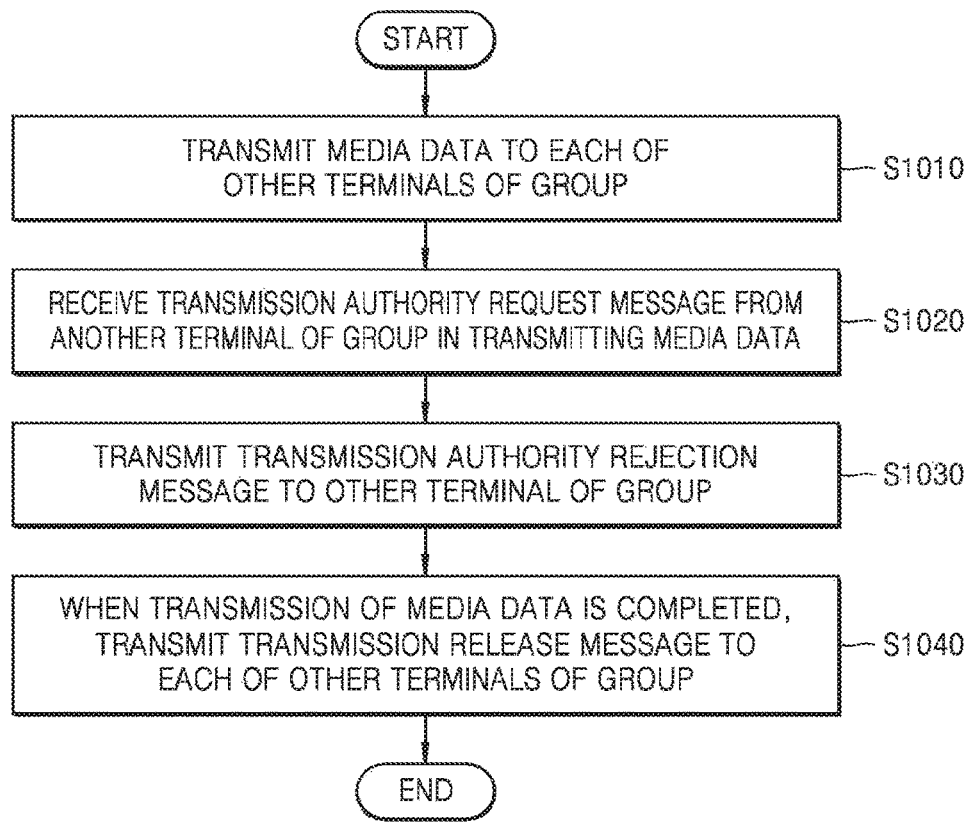
FIG. 10 is a flowchart for describing a method of transmitting media data when a first terminal receives a transmission authority request message from another terminal included in a group in the middle of transmitting the media data, according to an embodiment.

FIG. 10 is a flowchart for describing a method of transmitting media data when a first terminal 110 receives a transmission authority request message from another terminal included in a group in the middle of transmitting the media data, according to an embodiment.

In operation S1010, the first terminal 110 may transmit media data to each of other terminals 120, 130 and 140 of the group.

The first terminal 110 obtaining a transmission authority may transmit the media data to each of the other terminals 120, 130 and 140 of the group.

In operation S1020, the first terminal 110 may receive a transmission authority request message from another terminal (for example, 120) of the group in the middle of transmitting the media data.

For example, the first terminal 110 may receive the transmission authority request message from a second terminal 120 in the middle of transmitting the media data.

In operation S1030, the first terminal 110 may transmit a transmission authority rejection message to the other terminal (for example, 120) of the group.

When the transmission authority request message is received from another terminal of the group before the transmission of the media data is completed, the first terminal 110 may transmit the transmission authority rejection message to the other terminal (for example, 120) of the group. For example, when the first terminal 110 receives the transmission authority request message from the second terminal 120 in the middle of transmitting the media data, the first terminal 110 may transmit the transmission authority rejection message to the second terminal 120. Here, the first terminal 110 having a transmission authority may act as an arbitrary transmission authority mediator.

In operation S1040, when the transmission of the media data is completed, the first terminal 110 may transmit a transmission release message to each of the other terminals 120, 130 and 140 of the group.

In FIG. 10, each of the terminals 110, 120, 130 and 140 of the group may not store queue information about the transmission authority request message of another terminal which is generated while the first terminal 110 is transmitting the media data.

Therefore, another terminal (for example, 120) of the group which has requested a transmission authority while the first terminal 110 is transmitting the media data may again transmit the transmission authority request message to obtain the transmission authority after the transmission of the media data from the first terminal 110 is completed.

Figure 11:
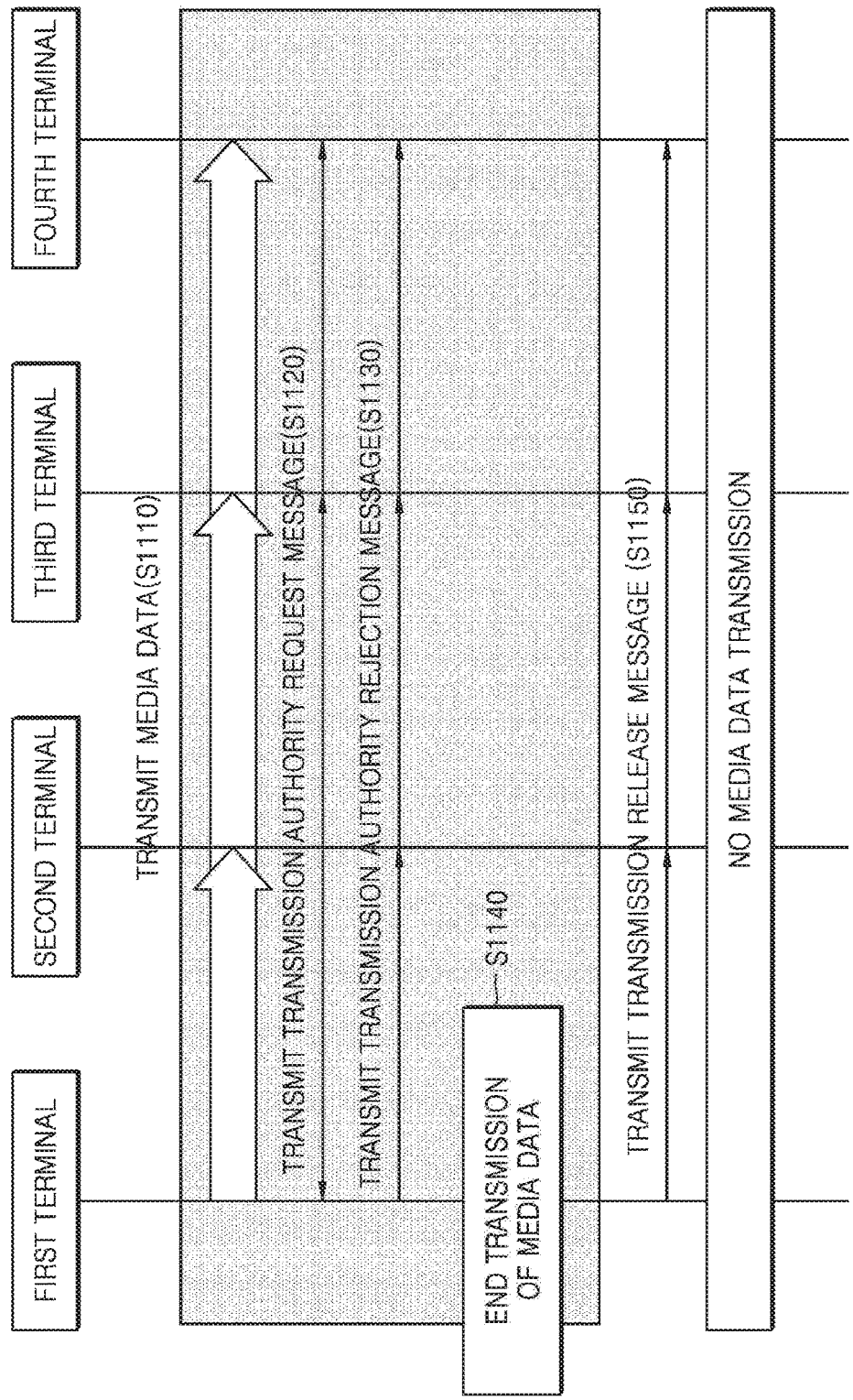
FIG. 11 is a flowchart for describing a method of transmitting media data when a transmission authority request message is transmitted from another terminal included in a group while a first terminal is transmitting the media data in a communication system, according to an embodiment.

FIG. 11 is a flowchart for describing a method of transmitting media data when a transmission authority request message is transmitted from another terminal included in a group while a first terminal 110 is transmitting the media data in a communication system 100, according to an embodiment.

In operation S1110, the first terminal 110 may transmit media data to each of other terminals 120, 130 and 140 of the group.

The first terminal 110 obtaining a transmission authority may transmit the media data to each of the other terminals 120, 130 and 140 of the group.

In operation S1120, a second terminal 120 may transmit a transmission authority request message to each of the first terminal 110, a third terminal 130, and a fourth terminal 140 while the first terminal 110 is transmitting the media data.

In operation S1130, the first terminal 110 may transmit a transmission authority rejection message to each of the other terminals 120, 130 and 140 of the group.

In operation S1140, the first terminal 110 may end the transmission of the media data.

In operation S1150, the first terminal 110 may transmit a transmission release message to each of the other terminals 120, 130 and 140 of the group.

Moreover, the first terminal 110 may not store queue information about the transmission authority request message of the second terminal 120 which is received in the middle transmitting the media data. Therefore, after the transmission of the media data from the first terminal 110 ends, there may not be a terminal transmitting the media data in the group. A terminal desiring to obtain the transmission authority may transmit the transmission authority request message to other terminals, thereby obtaining the transmission authority.

Figure 12:
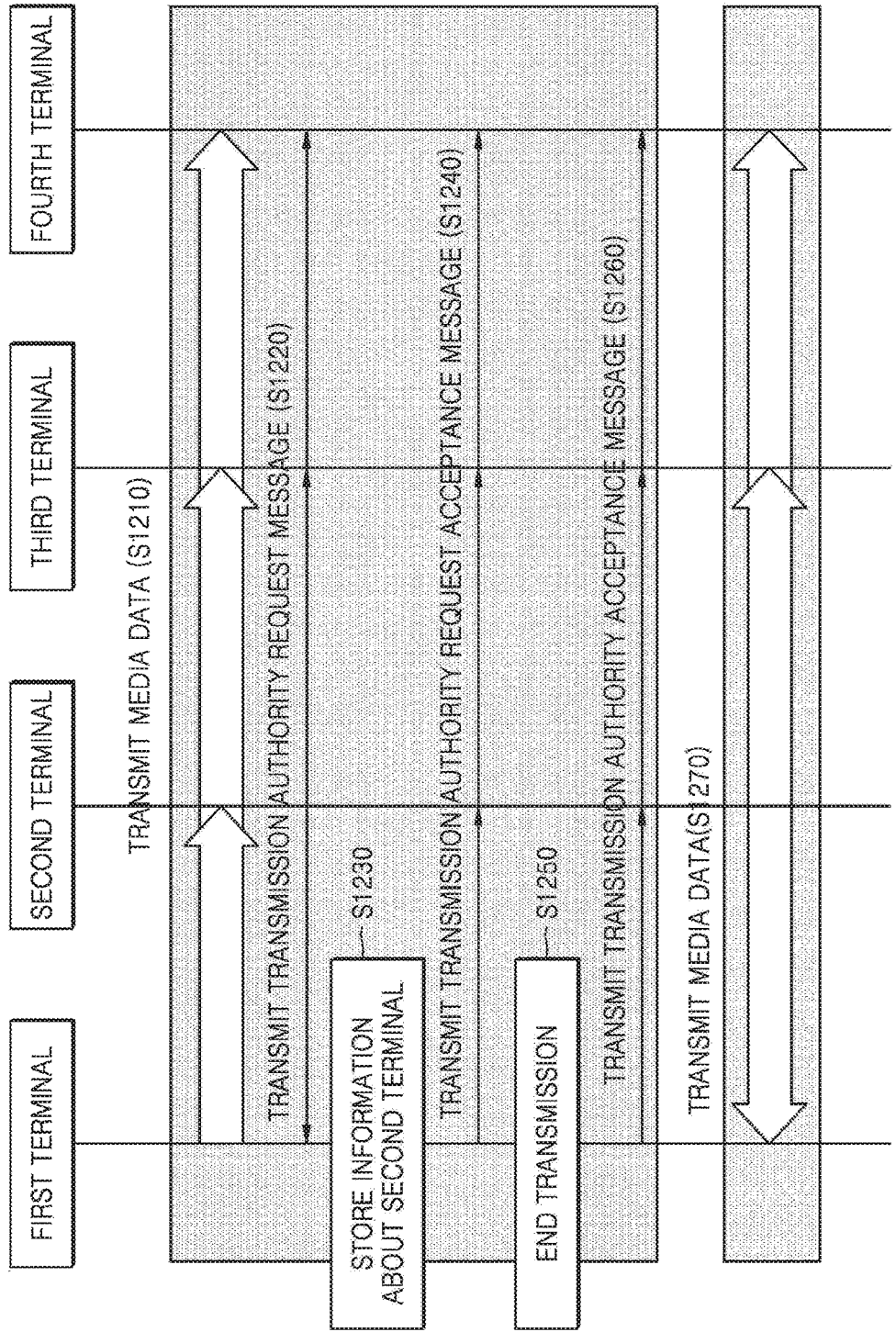
FIG. 12 is a flowchart for describing a method of transmitting media data when a plurality of terminals store queue information in a communication system, according to an embodiment.

FIG. 12 is a flowchart for describing a method of transmitting media data when a plurality of terminals store queue information in a communication system 100, according to an embodiment.

In operation S1210, a first terminal 110 may transmit media data.

In operation S1220, a second terminal 120 may transmit a transmission authority request message to the first terminal 110, the second terminal 120, a third terminal 130, and a fourth terminal 140 while the first terminal 110 is transmitting the media data.

In operation S1230, the first terminal 110 may store information about the second terminal 120.

In the transmission system 100 according to an embodiment, the first terminal 110 having a transmission authority may act as an arbitrary transmission authority mediator and may store the transmission authority request message received from another terminal (for example, 120) of the group.

For example, when the first terminal 110 receives the transmission authority request message from the second terminal 120 in the middle of transmitting the media data, the first terminal 110 may store queue information about the transmission authority request message of the second terminal 120. The queue information about the transmission authority request message of the second terminal 120 may include information about at least one of an identification value of the second terminal 120, a priority of the second terminal 120 in a queue, and a transmission authority status of the second terminal 120.

In operation S1240, the first terminal 110 may transmit a transmission authority request acceptance message for the second terminal 120 to each of the other terminals 120, 130 and 140 of the group. Here, the transmission authority request acceptance message may be a message indicating that the transmission authority request message of the second terminal 120 has been received.

The transmission authority request acceptance message may include information about at least one of the identification value of the second terminal 120, the priority of the second terminal 120 in the queue, and a time when the transmission authority request message of the second terminal 120 is received. By receiving the transmission authority request acceptance message, the second terminal 120 may check that the transmission authority request message of the second terminal 120 is received by the first terminal 110 having a transmission authority.

When the media data is received from the first terminal 110 but the transmission authority request message is not received, the second terminal 120 according to an embodiment may monitor whether the transmission authority request acceptance message is received for a certain time. Here, the certain time may be, for example, 1RTT. When the transmission authority request acceptance message is not received for the certain time, the second terminal 120 may retransmit the transmission authority request message.

In operation S1250, the first terminal 110 may end the transmission of the media data.

In operation S1260, the first terminal 110 may transmit a transmission authority acceptance message to each of the other terminals 120, 130 and 140 of the group.

When the transmission of the media data ends, the first terminal 110 according to an embodiment may determine a terminal having a transmission authority, based on at least one of a time when the transmission authority request message is received from another terminal which is waiting for transmission authority acceptance, a priority, and a random value, which are stored in a queue.

For example, the first terminal 110 may determine the second terminal 120, which is stored as having a first priority in the queue, as the terminal having the transmission authority. The first terminal 110 may transmit the transmission authority acceptance message for the second terminal 120, indicating that the second terminal 120 obtains the transmission authority, to each of the other terminals 120, 130 and 140 of the group.

Here, the transmission authority acceptance message may include information about another terminal which is waiting for the transmission authority. For example, when the third terminal 130 in addition to the second terminal 120 is stored as having a second priority for standby, the transmission authority acceptance message for the second terminal 120 may include a transmission authority status and an identification value of the third terminal 130. When the second terminal 120 obtains the transmission authority, the third terminal 130 having a second priority for standby may be updated to a first priority for standby.

In operation S1270, the second terminal 120 may transmit the media data to each of the first terminal 110, the third terminal 130, and the fourth terminal 140.

When the second terminal 120 according to an embodiment receives the transmission authority request message from another terminal (for example, 140) in the middle of transmitting the media data, the second terminal 120 may store queue information about the received transmission authority request message. As another example, when queue information detected from the transmission authority acceptance message received from the first terminal 110 is already stored, the second terminal 120 may add newly obtained queue information into the already stored queue information and store the newly obtained queue information.

Figure 13:
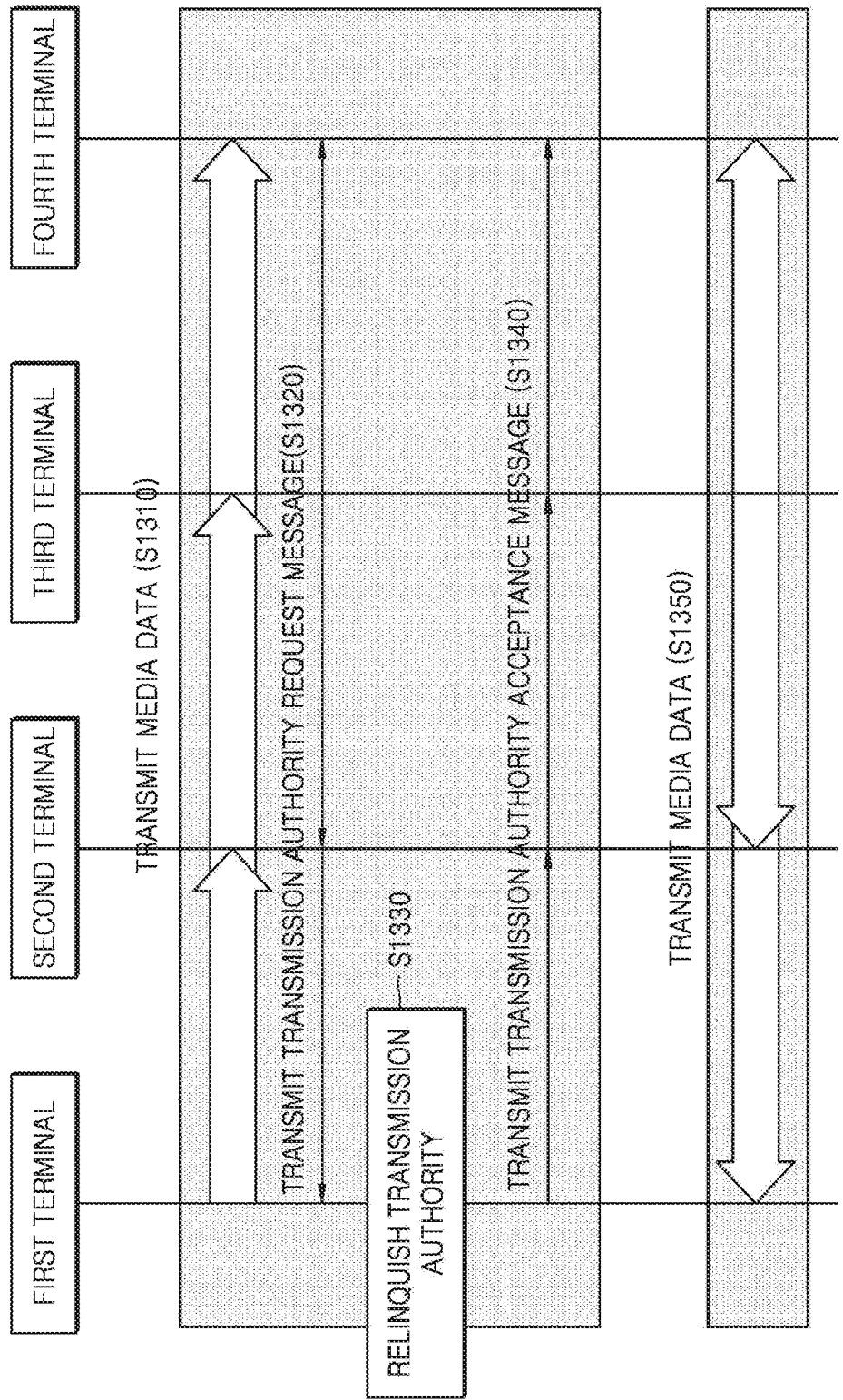
FIG. 13 is a flowchart for describing a method of transmitting media data when a first terminal receives a transmission authority request message from a higher-priority terminal in the middle of transmitting the media data in a communication system, according to an embodiment.

FIG. 13 is a flowchart for describing a method of transmitting media data when a first terminal 110 receives a transmission authority request message from a higher-priority terminal in the middle of transmitting the media data in a communication system 100, according to an embodiment.

In operation S1310, the first terminal 110 may transmit media data to each of other terminals 120, 130 and 140 of a group.

In operation S1320, a third terminal 130 may transmit a transmission authority request message to each of the first terminal 110, a second terminal 120, and a fourth terminal 140 while the first terminal 110 is transmitting the media data.

In operation S1330, when the first terminal 110 receives the transmission authority request message from the third terminal 130 (a higher-priority terminal) in the middle of transmitting the media data, the first terminal 110 may relinquish a transmission authority. Also, information about a priority of the third terminal 130 may be added into the transmission authority request message of the third terminal 130.

In operation S1340, the first terminal 110 may transmit a transmission authority acceptance message for the third terminal 130 to each of the other terminals 120 and 140 of the group.

In operation S1350, when the transmission authority acceptance message is received, the third terminal 130 may transmit the media data to each of the first terminal 110, the second terminal 120, and the fourth terminal 140.

Figure 14:
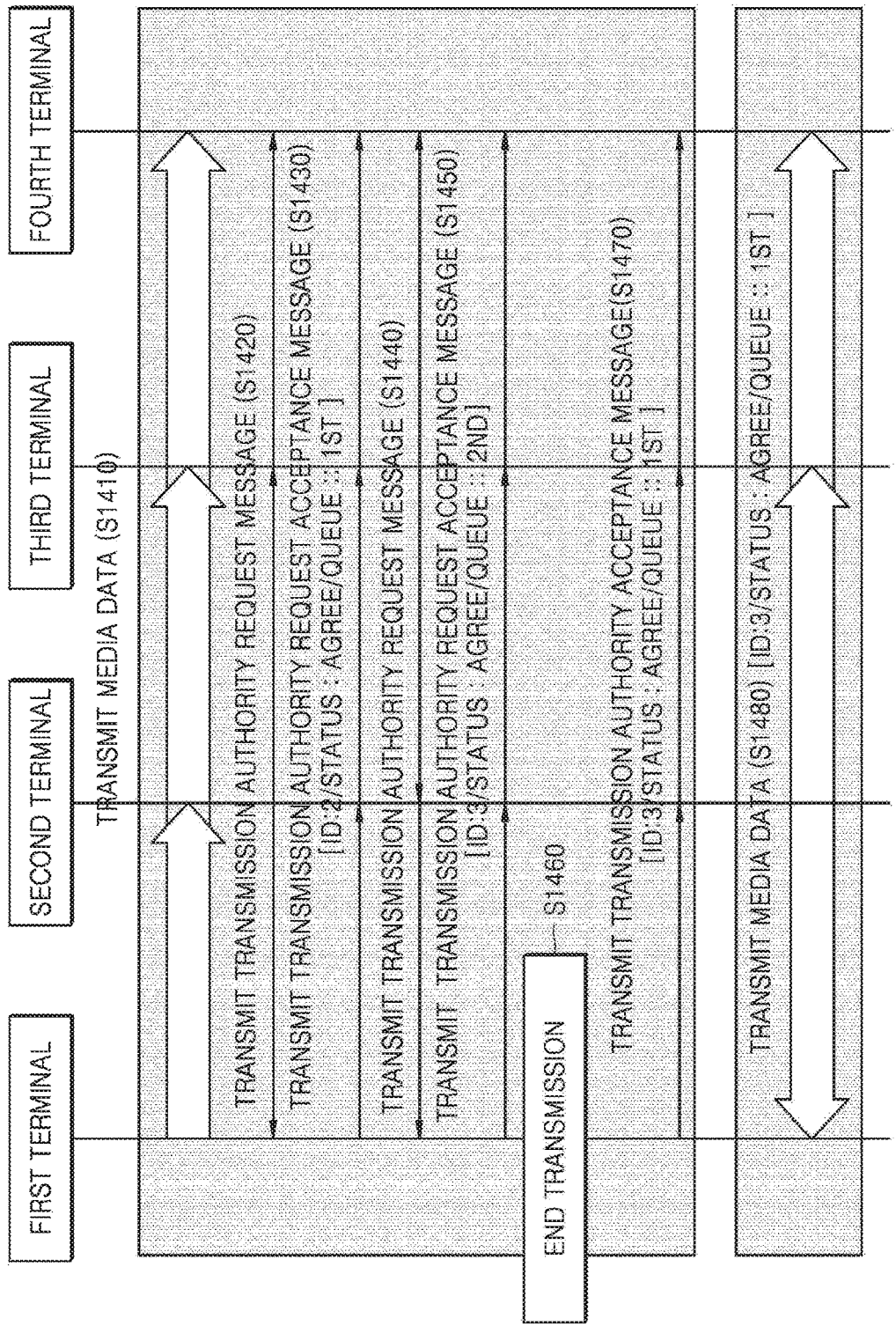
FIG. 14 is a flowchart for describing a method of mediating in a transmission authority by using a media burst control protocol (MBCP) in a communication system, according to an embodiment.

FIG. 14 is a flowchart for describing a method of mediating in a transmission authority by using a media burst control protocol (MBCP) in a communication system 100, according to an embodiment.

In operation S1410, a first terminal 110 may transmit media data to each of other terminals 120, 130 and 140 of a group.

In operation S1420, a second terminal 120 may transmit a transmission authority request message to each of the first terminal 110, a third terminal 130, and a fourth terminal 140 in the middle of receiving the media data from the first terminal 110.

In operation S1430, the first terminal 110 may transmit a transmission authority request acceptance message for the second terminal 120 to each of the other terminals 130 and 140 of the group.

In the transmission system 100 according to an embodiment, the first terminal 110 having a transmission authority may act as an arbitrary transmission authority mediator and may store the transmission authority request message received from another terminal (for example, 120) of the group.

For example, the first terminal 110 may store queue information about the transmission authority request message of the second terminal 120. The queue information about the transmission authority request message of the second terminal 120 may include information about at least one of an identification value of the second terminal 120, a priority of the second terminal 120 in a queue, and a transmission authority status of the second terminal 120.

Moreover, the first terminal 110 according to an embodiment may transmit a transmission authority request acceptance message for the second terminal 120 to each of the other terminals 120, 130 and 140 of the group. Here, the transmission authority request acceptance message may be a message indicating that the transmission authority request message of the second terminal 120 has been received.

The transmission authority request acceptance message according to an embodiment may include information about at least one of the identification value of the second terminal 120, the priority of the second terminal 120 in the queue, and a time when the transmission authority request message of the second terminal 120 is received. By receiving the transmission authority request acceptance message, the second terminal 120 may check that the transmission authority request message of the second terminal 120 is received by the first terminal 110 having a transmission authority.

When the media data is received from the first terminal 110 but the transmission authority request message is not received, the second terminal 120 according to an embodiment may monitor whether the transmission authority request acceptance message is received for a certain time. When the transmission authority request acceptance message is not received for the certain time, the second terminal 120 may retransmit the transmission authority request message.

In operation S1440, the third terminal 130 may transmit the transmission authority request message to each of the first terminal 110, the second terminal 120, and the fourth terminal 140 while the first terminal is transmitting the media data.

In operation S1450, the first terminal 110 may transmit the transmission authority request acceptance message for the third terminal 130 to each of the other terminals 120, 130 and 140 of the group.

The first terminal 110 may store queue information about the transmission authority request message of the third terminal 130. The queue information about the transmission authority request message of the third terminal 130 may include information about at least one of an identification value of the third terminal 130, a priority of the third terminal 130 in the queue, and a transmission authority status of the third terminal 130.

Moreover, the first terminal 110 according to an embodiment may transmit the transmission authority request acceptance message for the third terminal 130 to each of the other terminals 120, 130 and 140 of the group. Here, the transmission authority request acceptance message may be a message indicating that the transmission authority request message of the third terminal 130 has been received.

The transmission authority request acceptance message according to an embodiment may include information about at least one of the identification value of the third terminal 130, the priority of the third terminal 130 in the queue, and a time when the transmission authority request message of the third terminal 130 is received. By receiving the transmission authority request acceptance message, the third terminal 130 may check that the transmission authority request message of the third terminal 130 is received by the first terminal 110 having the transmission authority.

According to an embodiment, when the transmission authority request message of the third terminal 130 is received later than the transmission authority request message of the second terminal 120, the first terminal 110 may determine a standby priority of the second terminal 120 as a first priority and may determine a standby priority of the third terminal 130 as a second priority. However, this is merely an embodiment, the standby priority of the second terminal 120 may be determined based on at least one of the priority and random value of the second terminal 120, and the standby priority of the third terminal 130 may be determined based on at least one of the priority and random value of the third terminal 130.

When the media data is received from the first terminal 110 but the transmission authority request message is not received, the second terminal 120 according to an embodiment may monitor whether the transmission authority request acceptance message is received for a certain time. When the transmission authority request acceptance message is not received for the certain time, the second terminal 120 may retransmit the transmission authority request message.

In operation S1460, the first terminal 110 may end the transmission of the media data.

In operation S1470, the first terminal 110 may transmit a transmission authority acceptance message for the second terminal 120 having a first priority for standby.

When the transmission of the media data ends, the first terminal 110 according to an embodiment may determine a terminal having a transmission authority, based on at least one of a time when the transmission authority request message is received from another terminal which is waiting for transmission authority acceptance, a priority, and a random value, which are stored in the queue.

For example, the first terminal 110 may determine the second terminal 120, which is stored as having a first priority in the queue, as the terminal having the transmission authority. The transmission authority acceptance message for the second terminal 120 may include information about an identification value and a transmission authority status of the second terminal 120 for informing that the transmission authority of the second terminal 120 is accepted. Also, the transmission authority acceptance message for the second terminal 120 may include information about the third terminal 130 which is waiting for the transmission authority. When the transmission authority of the second terminal 120 is accepted, the third terminal 130 having a second priority for standby may be updated to a first priority for standby.

In operation S1480, the second terminal 120 may transmit the media data to each of the first terminal 110, the third terminal 130, and the fourth terminal 140.

When the second terminal 120 according to an embodiment receives the transmission authority acceptance message from the first terminal 110, the second terminal 120 may transmit the media data to each of the first terminal 110, the third terminal 130, and the fourth terminal 140.

Moreover, the second terminal 120 may store transmission authority status information about the third terminal 130 included in the received transmission authority acceptance message. The second terminal 120 may manage the transmission authority status information about the third terminal 130 until the transmission of the media data ends.

Figure 15:
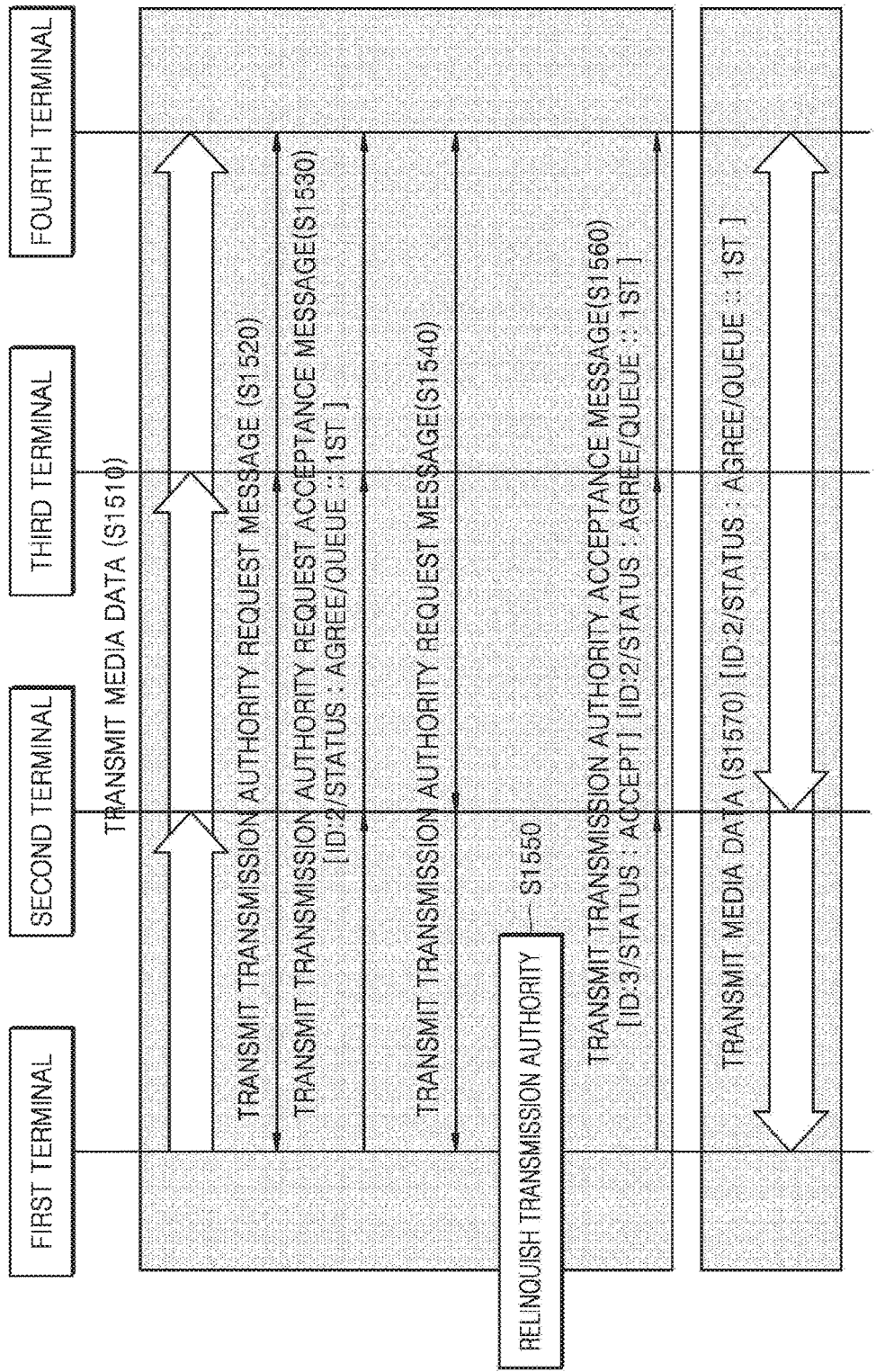
FIG. 15 is a flowchart for describing a method of mediating in a transmission authority by using an MBCP when a transmission authority request message is transmitted from a higher-priority terminal while a first terminal is transmitting media data in a communication system, according to an embodiment.

FIG. 15 is a flowchart for describing a method of mediating in a transmission authority by using an MBCP when a transmission authority request message is transmitted from a higher-priority terminal while a first terminal 120 is transmitting media data in a communication system 100, according to an embodiment.

In operation S1510, the first terminal 110 may transmit media data to each of other terminals 120, 130 and 140 of a group.

In operation S1520, a second terminal 120 may transmit a transmission authority request message to each of the first terminal 110, a third terminal 130, and a fourth terminal 140 in the middle of receiving the media data from the first terminal 110.

In operation S1530, the first terminal 110 may transmit a transmission authority request acceptance message for the second terminal 120 to each of the other terminals 130 and 140 of the group.

Moreover, operation S530 may correspond to operation S1430 described above with reference to FIG. 14.

In operation S1540, the third terminal 130 may transmit a transmission authority request message to each of the first terminal 110, the second terminal 120, and the fourth terminal 140 while the first terminal 110 is transmitting the media data.

In operation S1550, when the first terminal 110 receives the transmission authority request message from the third terminal 130 (a higher-priority terminal) in the middle of transmitting the media data, the first terminal 110 may relinquish a transmission authority. Also, information about a priority of the third terminal 130 may be added into the transmission authority request message of the third terminal 130.

In operation S1560, the first terminal 110 may transmit a transmission authority acceptance message for the third terminal 130 to each of the other terminals 120 and 140 of the group.

When the transmission of the media data ends, the first terminal 110 according to an embodiment may determine a terminal having a transmission authority, based on at least one of a time when the transmission authority request message is received from another terminal which is waiting for transmission authority acceptance, a priority, and a random value, which are stored in a queue.

For example, the first terminal 110 may determine the second terminal 120, which is stored as having a first priority in the queue, as the terminal having the transmission authority. The transmission authority acceptance message for the second terminal 120 may include information about an identification value and a transmission authority status of the second terminal 120 for informing that the transmission authority of the second terminal 120 is accepted. Also, the transmission authority acceptance message for the second terminal 120 may include information about the third terminal 130 which is waiting for the transmission authority. When the transmission authority of the second terminal 120 is accepted, the third terminal 130 having a second priority for standby may be updated to a first priority for standby.

In operation S1570, the second terminal 120 may transmit the media data to each of the first terminal 110, the third terminal 130, and the fourth terminal 140.

When the second terminal 120 according to an embodiment receives the transmission authority acceptance message from the first terminal 110, the second terminal 120 may transmit the media data to each of the first terminal 110, the third terminal 130, and the fourth terminal 140.

Moreover, the second terminal 120 may store transmission authority status information about the third terminal 130 included in the received transmission authority acceptance message. The second terminal 120 may manage the transmission authority status information about the third terminal 130 until the transmission of the media data ends.

Figure 16:
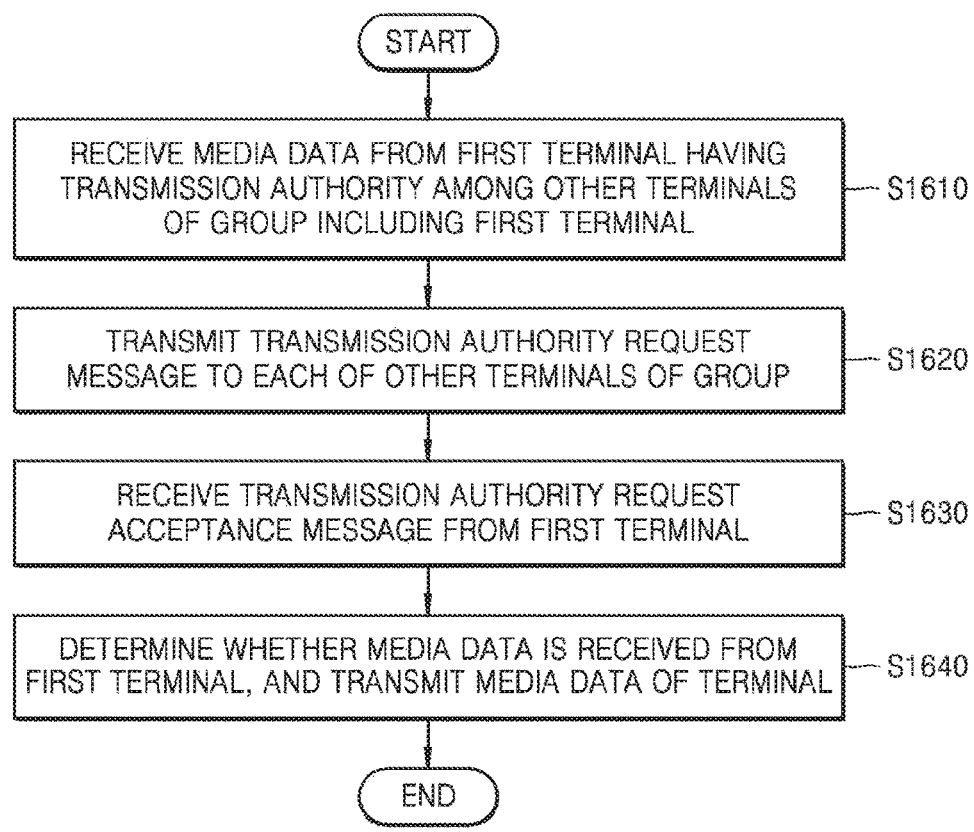
FIG. 16 is a flowchart for describing a method of transmitting, by a terminal, media data according to whether the media data is received from a first terminal having a transmission authority in a group, according to an embodiment.

FIG. 16 is a flowchart for describing a method of transmitting, by a terminal (for example, 120), media data according to whether the media data is received from a first terminal 110 having a transmission authority in a group, according to an embodiment.

In operation S1610, the terminal (for example, 120) may receive media data from the first terminal 110 having the transmission authority among other terminals 110, 130 and 140 of the group.

In operation S1620, the terminal (for example, 120) may transmit a transmission authority request message to each of the other terminals 110, 130 and 140 of the group.

The terminal (for example, 120) according to an embodiment may transmit the transmission authority request message to each of the other terminals 110, 130 and 140 of the group in the middle of receiving the media data from the first terminal 110.

In operation S1630, the terminal (for example, 120) may receive a transmission authority request acceptance message from the first terminal 110.

By receiving the transmission authority request acceptance message from the first terminal 110, the terminal (for example, 120) may check that the transmission authority request message of the terminal (for example, 120) is received by the first terminal 110. Also, the transmission authority request acceptance message may include information about at least one of an identification value of the terminal (for example, 120), a priority of the terminal (for example, 120) in a queue, and a time when the transmission authority request message of the terminal (for example, 120) is received.

Moreover, when another terminal (for example, 140) in addition to the terminal (for example, 120) transmits the transmission authority request message to the first terminal 110, information about the other terminal (for example, 140) may be added into the transmission authority request acceptance message.

In operation S1640, the terminal (for example, 120) may determine whether the media data is received from the first terminal 110 and may transmit the media data of the terminal (for example, 120), based on a result of the determination.

By receiving a transmission release message from the first terminal 110, the terminal (for example, 120) according to an embodiment may check that the transmission of the media data from the first terminal 110 ends.

Moreover, the terminal (for example, 120) may determine a terminal having a transmission authority, based on information about a transmission authority of the terminal (for example, 120) included in the received transmission release message. For example, when a priority of the terminal (for example, 120) is the highest among priorities of terminals that have requested the transmission authority from the first terminal 120, the transmission authority of the terminal (for example, 120) may be accepted. Therefore, the terminal (for example, 120) may transmit the media data of the terminal (for example, 120) to each of the other terminals 110, 130 and 140 of the group.

According to another embodiment, when the media data is not received from the first terminal 110 for a certain time, the terminal (for example, 120) may determine that the first terminal 110 is in an absent state. When it is determined that the first terminal 110 is in the absent state, the terminal (for example, 120) may transmit the media data of the terminal (for example, 120) to each of the other terminals 110, 130 and 140 of the group, based on the transmission authority status information about the terminal (for example, 120) obtained from the transmission authority request acceptance message.

Moreover, when the media data is not received from the first terminal 110 for a certain time, the terminal (for example, 120) may retransmit the transmission authority request message to each of the other terminals 110, 130 and 140 of the group, for determining whether the first terminal 110 is in the absent state. When the transmission authority request acceptance message is not retransmitted for a certain time from a time when the transmission authority request message is transmitted, the terminal (for example, 120) may determine that the first terminal 110 is in the absent state.

However, this is merely an embodiment, and a method of determining, by the terminal (for example, 120), whether the first terminal 110 having a transmission authority is in an absent state is not limited thereto.

Figure 17:
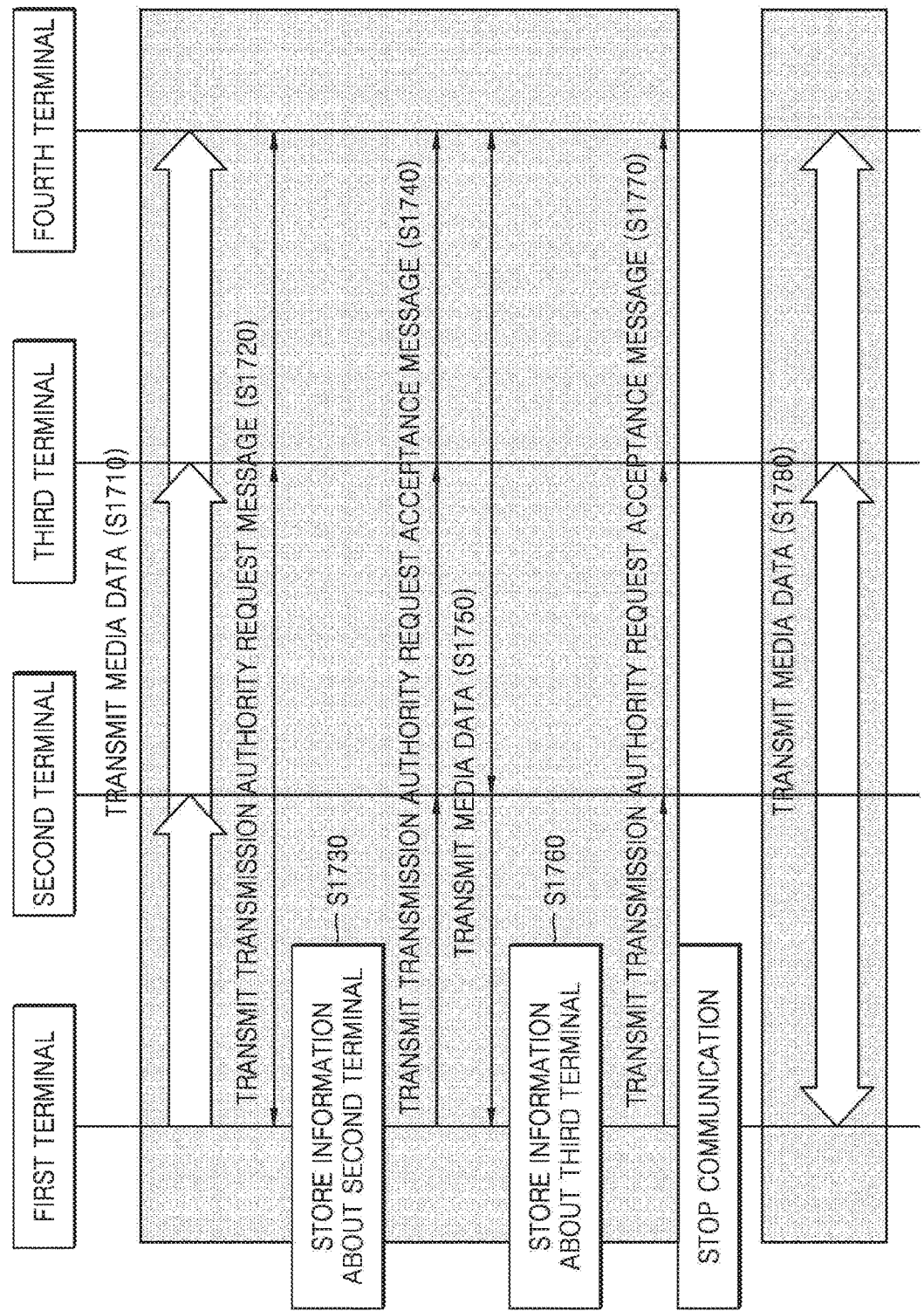
FIG. 17 is a flowchart for describing a method of determining a terminal having a transmission authority when a first terminal having the transmission authority is absent from a certain position in a communication system, according to an embodiment.

FIG. 17 is a flowchart for describing a method of determining a terminal having a transmission authority when a first terminal 110 having the transmission authority is absent from a certain position in a communication system 100, according to an embodiment.

In operation S1710, the first terminal 110 may transmit media data to each of a second terminal 120, a third terminal 130, and a fourth terminal 140.

In operation S1720, the second terminal 120 may transmit a transmission authority request message to each of other terminals 110, 130 and 140 of the group in the middle of receiving the media data from the first terminal 110.

In operation S1730, the first terminal 110 may store information about the second terminal 120, based on the transmitted transmission authority request message. Here, the information about the second terminal 120 may include, for example, information about at least one of an identification value of the second terminal 120, a priority of the second terminal 120 in a queue, and a time when the transmission authority request message of the second terminal 120 is received.

In operation S1740, the first terminal 110 may transmit a transmission authority request acceptance message for the second terminal 120 to each of the second terminal 120, the third terminal 130, and the fourth terminal 140.

The transmission authority request acceptance message according to an embodiment may include information about at least one of the identification value of the second terminal 120, the priority of the second terminal 120 in the queue, and the time when the transmission authority request message of the second terminal 120 is received. By receiving the transmission authority request acceptance message, the second terminal 120 may check that the transmission authority request message of the second terminal 120 is received by the first terminal 110 having a transmission authority.

In operation S1750, the third terminal 130 may transmit media data to each of the first terminal 110, the second terminal 120, and the fourth terminal 140.

In operation S1760, the first terminal 110 may store information about the third terminal 130, based on the transmission authority request message received from the third terminal 130. Here, the information about the third terminal 130 may include, for example, information about at least one of an identification value of the third terminal 130, a priority of the third terminal 130 in a queue, and a time when the transmission authority request message of the third terminal 130 is received.

Herein, it may be assumed that the priority of the second terminal 120 is higher than that of the third terminal 130. Therefore, a standby priority of the second terminal 120 being a first priority and a standby priority of the third terminal 130 being a second priority may be stored in the queue of the first terminal 110.

In operation S1770, the first terminal 110 may transmit the transmission authority request acceptance message to each of the second terminal 120, the third terminal 130, and the fourth terminal 140.

The transmission authority request acceptance message according to an embodiment may include information about at least one of the identification values of the second and third terminals 120 and 130, the priorities of the second and third terminals 120 and 130 in the queue, the time when the transmission authority request message of the second terminal 120 is received, and the time when the transmission authority request message of the third terminal 130 is received. By receiving the transmission authority request acceptance message, the third terminal 130 may check that the transmission authority request message of the third terminal 130 is received by the first terminal 110 having the transmission authority.

In operation S1780, when the media data is not received from the first terminal 110 for a certain time, the second terminal 120 may transmit the media data of the second terminal 120.

Despite that a message indicating the end of transmission is not received from the first terminal 110, when the media data is not received from the first terminal 110, the second terminal 120 according to an embodiment may determine that the first terminal 110 is in an absent state.

Moreover, the second terminal 120 may retransmit the transmission authority request message for checking whether the first terminal 110 is in the absent state. When the transmission authority request acceptance message is not received for a certain time from a time when the transmission authority request message is retransmitted, the second terminal 120 may determine that the first terminal 110 is in the absent state.

Moreover, the second terminal 120 may be a terminal having a first priority for standby. When it is determined that the first terminal 110 is in the absent state, the second terminal 120 may obtain the transmission authority.

Figure 18:
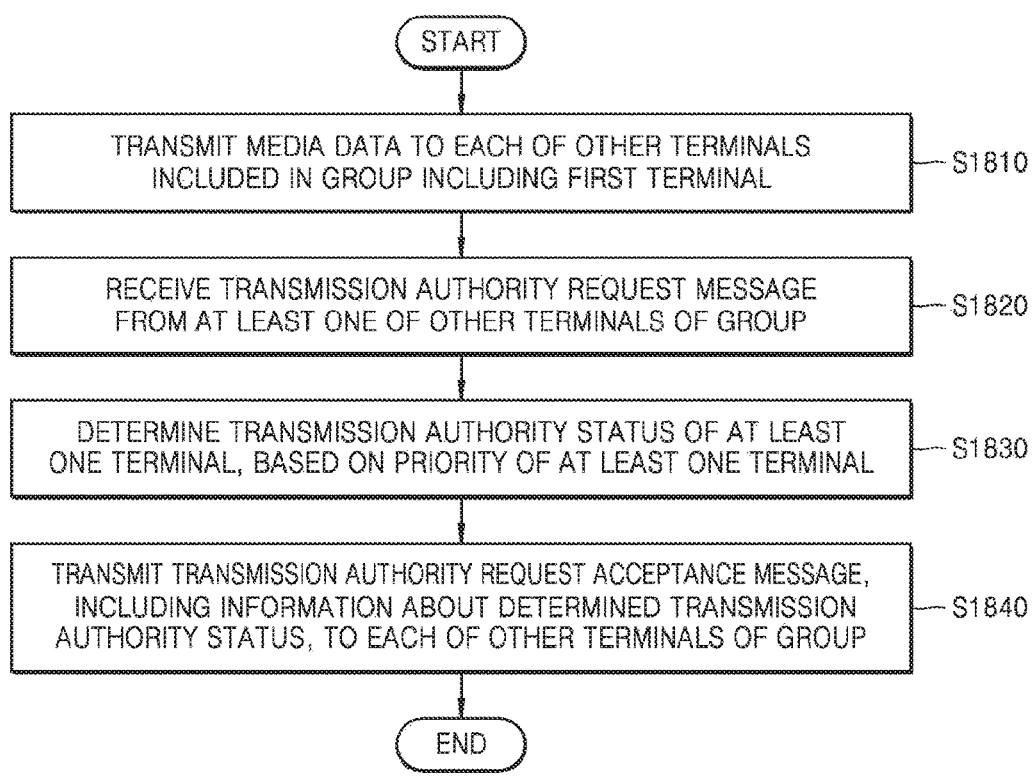
FIG. 18 is a flowchart for describing a method of determining a transmission authority state of another terminal when a first terminal having a transmission authority receives from a transmission authority request message from the other terminal in the middle of transmitting media data, according to an embodiment.

FIG. 18 is a flowchart for describing a method of determining a transmission authority state of another terminal when a first terminal 110 having a transmission authority receives from a transmission authority request message from the other terminal in the middle of transmitting media data, according to an embodiment.

In operation S1810, the first terminal 110 may transmit media data to each of other terminals 120, 130 and 140 included in a group including the first terminal 110.

In operation S1820, the first terminal 110 may receive a transmission authority request message from at least one of the other terminals 120, 130 and 140 of the group.

In operation S1830, the first terminal 110 may determine a transmission authority status of the at least one terminal, based on a priority of the at least one terminal. Here, the transmission authority status of the at least one terminal may indicate a standby priority for obtaining a transmission authority.

The standby priority may be determined based on a random value generated from the at least one terminal, in addition to a predetermined priority of the at least one terminal. As another example, the standby priority may be determined based on a time when the transmission authority request message of the at least one terminal is received by the first terminal 110.

In operation S1840, the first terminal 110 may transmit a transmission authority request acceptance message, including information about the determined transmission authority status, to each of the other terminals 120, 130 and 140 of the group.

Figure 19:
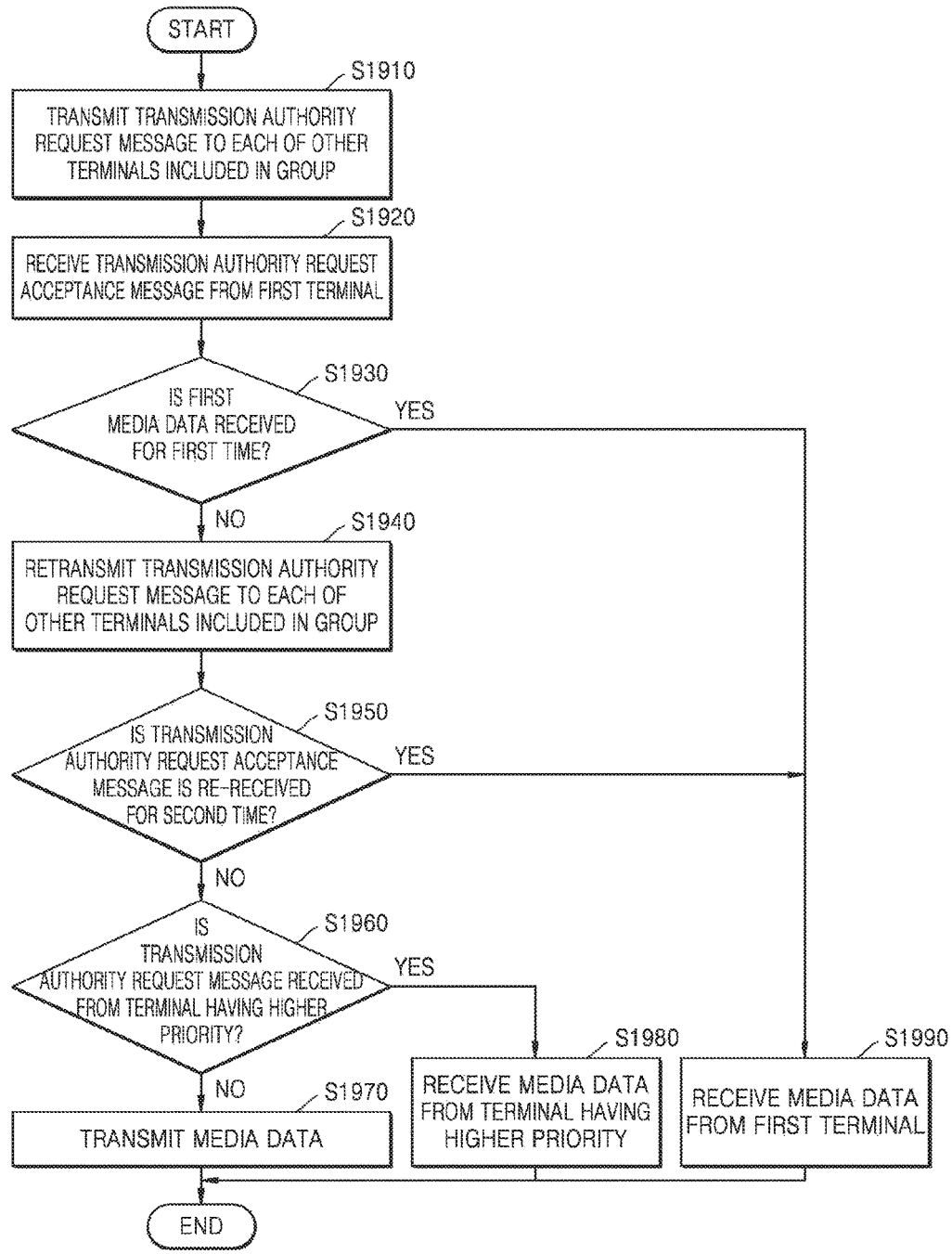
FIG. 19 is a flowchart for describing a method of determining a terminal having a transmission authority when a first terminal is absent from a certain position in a communication system, according to an embodiment.

FIG. 19 is a flowchart for describing a method of determining a terminal having a transmission authority when a first terminal 110 is absent from a certain position in a communication system 100, according to an embodiment.

In operation S1910, a terminal (for example, 120) may transmit a transmission authority request message to each of other terminals 110, 130 and 140 included in a group.

In operation S1920, the terminal (for example, 120) may receive a transmission authority request acceptance message from the first terminal 110 having a transmission authority.

In operation S1930, the terminal (for example, 120) may determine whether first media data is received for a first time.

In operation S1940, the terminal (for example, 120) may retransmit the transmission authority request message to each of the other terminals 110, 130 and 140 included in the group.

In operation S1950, the terminal (for example, 120) may determine whether the transmission authority request acceptance message is re-received for a second time.

In operation S1960, the terminal (for example, 120) may determine whether there is a terminal having a higher priority among one or more terminals which have requested the transmission authority from the first terminal 110.

In operation S1970, the terminal (for example, 120) may transmit media data.

In operation S1980, the terminal (for example, 120) may receive the media data from the terminal having a higher priority among the one or more terminals which have requested the transmission authority from the first terminal 110.

In operation S1990, the terminal (for example, 120) may receive the media data from the first terminal 110 until transmission by the first terminal 110 ends.

Figure 20:
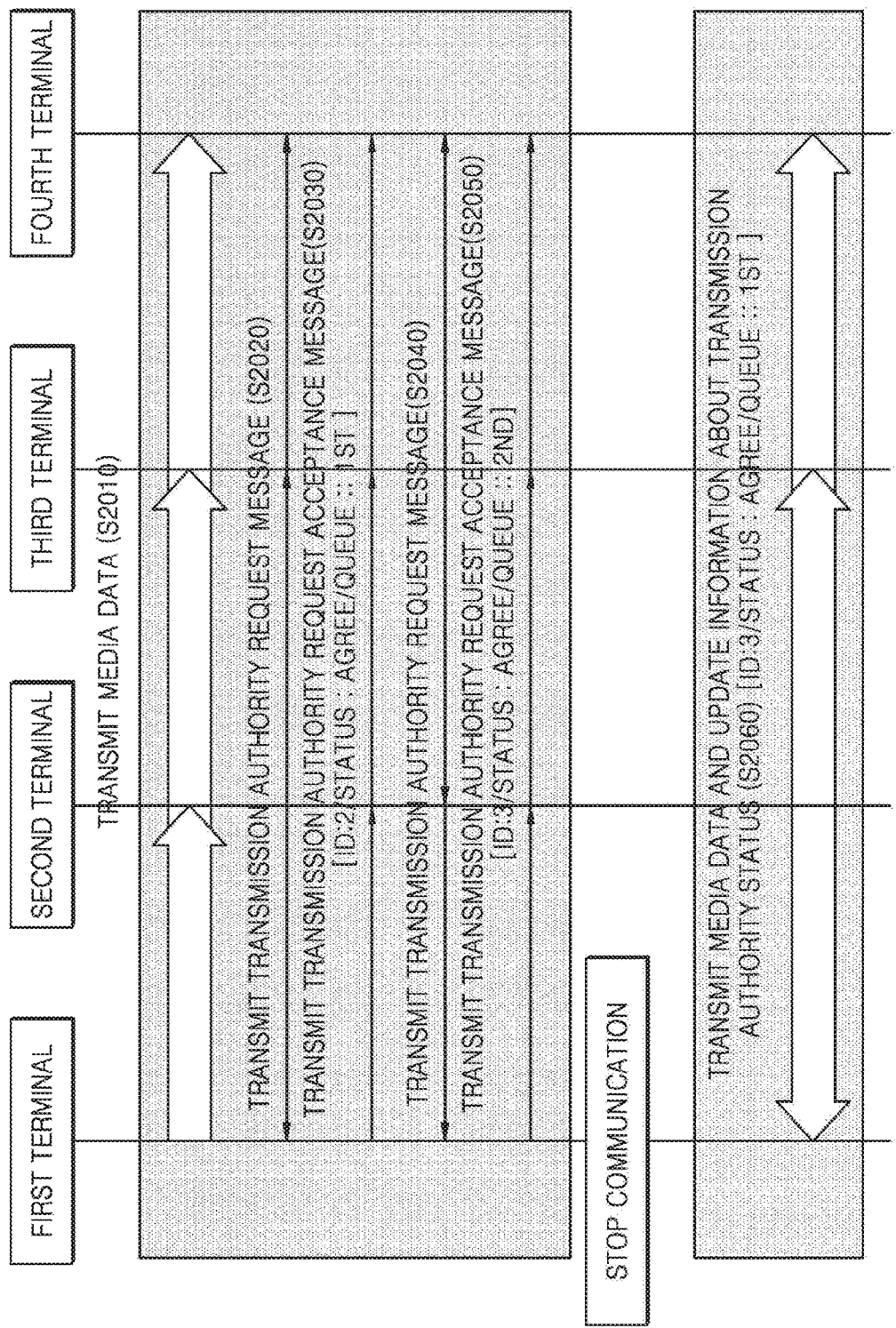
FIG. 20 is a flowchart for describing a method of determining a terminal having a transmission authority when a first terminal having the transmission authority is absent from a certain position in a communication system, according to an embodiment.

FIG. 20 is a flowchart for describing a method of determining a terminal having a transmission authority when a first terminal 110 having the transmission authority is absent from a certain position in a communication system 100, according to an embodiment.

In operation S2010, the first terminal 110 may transmit media data to each of other terminals 120, 130 and 140 of a group.

In operation S2020, the second terminal 120 may transmit a transmission authority request message to each of the first terminal 110, a third terminal 130, and a fourth terminal 140.

In operation S2030, the first terminal 110 may transmit a transmission authority request acceptance message, corresponding to the transmission authority request message of the second terminal 120, to each of the other terminals 120, 130 and 140 of the group.

The transmission authority request acceptance message according to an embodiment may include information about at least one of an identification value of the second terminal 120, a priority of the second terminal 120 in a queue, and a time when the transmission authority request message of the second terminal 120 is received.

In operation S2040, the third terminal 130 may transmit the transmission authority request message to each of the first terminal 110, the second terminal 120, and the fourth terminal 140.

In operation S2050, the first terminal 110 may transmit the transmission authority request acceptance message, corresponding to the transmission authority request message of the third terminal 130, to each of the other terminals 120, 130 and 140 of the group.

The transmission authority request acceptance message according to an embodiment may include information about at least one of the identification values of the second and third terminals 120 and 130, the priorities of the second and third terminals 120 and 130 in the queue, the time when the transmission authority request message of the second terminal 120 is received, and the time when the transmission authority request message of the third terminal 130 is received.

In the embodiment of FIG. 20, a standby priority of the second terminal 120 transmitting the transmission authority request message which is first received by the first terminal 110 may be determined as a first priority. Therefore, a standby priority of the third terminal 130 may be determined as a second priority.

In operation S2060, when the media data is not received from the first terminal 110 for a certain time, the second terminal 120 may transmit the media data of the second terminal 120.

The second terminal 120 according to an embodiment may check standby priority information about the second terminal 120, based on the transmission authority request acceptance message received from the first terminal 110. When it is determined that the second terminal 120 is a terminal having a standby priority which is a first priority, the second terminal 120 may transmit media data to each of the first terminal 110, the third terminal 130, and the fourth terminal 140.

The second terminal 120 may update a standby priority of the third terminal 130 to a first priority.

Figure 21:
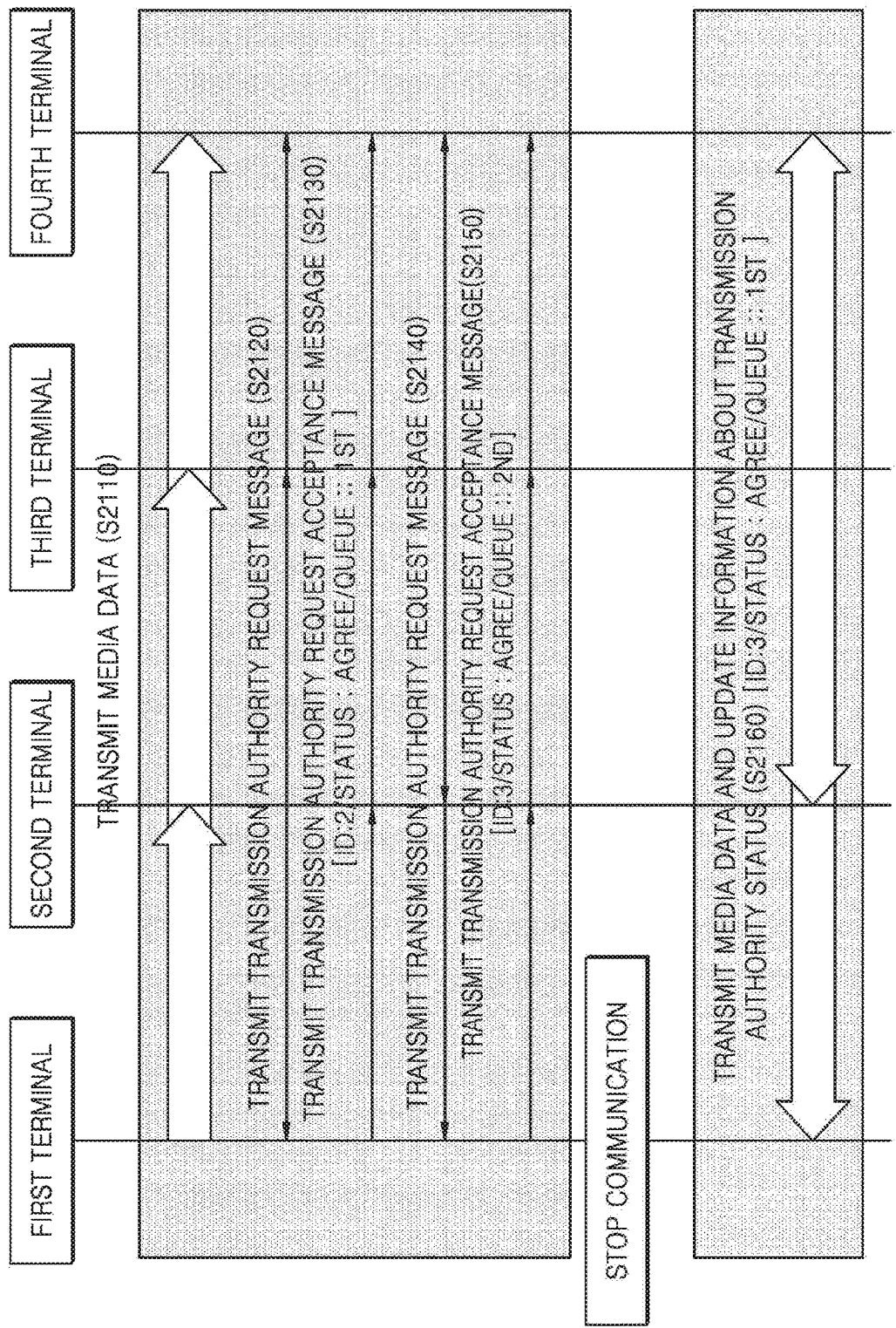
FIG. 21 is a flowchart for describing a method of determining a terminal having a transmission authority according to priorities when a first terminal having the transmission authority is absent from a certain position in a communication system, according to an embodiment.

FIG. 21 is a flowchart for describing a method of determining a terminal having a transmission authority according to priorities when a first terminal 110 having the transmission authority is absent from a certain position in a communication system 100, according to an embodiment.

In operation S2110, the first terminal 110 may transmit media data to each of other terminals 120, 130 and 140 of a group.

In operation S2120, the second terminal 120 may transmit a transmission authority request message to each of the first terminal 110, a third terminal 130, and a fourth terminal 140.

In operation S2130, the first terminal 110 may transmit a transmission authority request acceptance message, corresponding to the transmission authority request message of the second terminal 120, to each of the other terminals 120, 130 and 140 of the group.

The transmission authority request acceptance message according to an embodiment may include information about at least one of an identification value of the second terminal 120, a priority of the second terminal 120 in a queue, and a time when the transmission authority request message of the second terminal 120 is received.

In operation S2140, the third terminal 130 may transmit the transmission authority request message to each of the first terminal 110, the second terminal 120, and the fourth terminal 140.

In operation S2150, the first terminal 110 may transmit the transmission authority request acceptance message, corresponding to the transmission authority request message of the third terminal 130, to each of the other terminals 120, 130 and 140 of the group.

The transmission authority request acceptance message according to an embodiment may include information about at least one of the identification values of the second and third terminals 120 and 130, the priorities of the second and third terminals 120 and 130 in the queue, the time when the transmission authority request message of the second terminal 120 is received, and the time when the transmission authority request message of the third terminal 130 is received.

In the embodiment of FIG. 21, it may be assumed that a priority of the third terminal 130 is higher than that of the second terminal 120. Therefore, a standby priority of the third terminal 130 may be determined as a first priority. On the other hand, a standby priority of the second terminal 120 may be determined as a second priority.

In operation S2160, when the media data is not received from the first terminal 110 for a certain time, the third terminal 130 may transmit the media data of the third terminal 130.

The third terminal 130 according to an embodiment may check standby priority information about the third terminal 130, based on the transmission authority request acceptance message received from the first terminal 110. When it is determined that the third terminal 130 is a terminal having a standby priority which is a first priority, the third terminal 130 may transmit media data to each of the first terminal 110, the second terminal 120, and the fourth terminal 140.

The third terminal 130 may update a standby priority of the third terminal 130 to a first priority.

Figure 22:
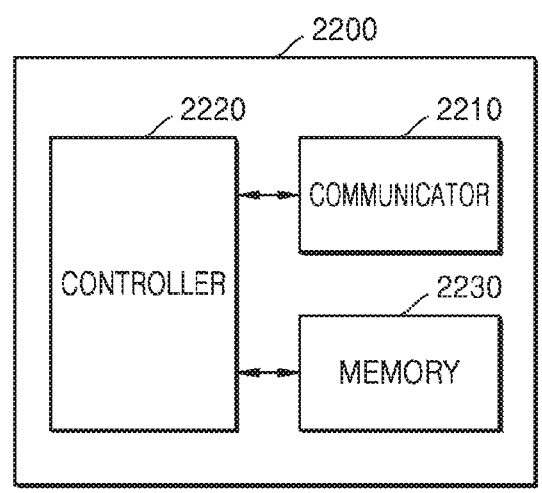
FIG. 22 is a block diagram of a terminal according to an embodiment.

FIG. 22 is a block diagram of a terminal 2200 according to an embodiment.

Referring to FIG. 22, the terminal 2200 according to an embodiment may include a communicator 2210, a controller 2220, and a memory 2230.

The terminal 2200 of FIG. 22 is illustrated as including only elements associated with the present embodiment. Therefore, it may be understood by one of ordinary skill in the art that the terminal 2200 may further include general-use elements in addition to the elements of FIG. 22.

The communicator 2210 may receive a transmission authority request message from a first terminal of a plurality of terminals included in a group including the terminal 2200. The communicator 2210 may transmit a transmission authority acceptance message for the first terminal to each of the other terminals of the group and may receive media data from the first terminal, based on a result of determination by the controller 2220.

When the transmission authority acceptance message for the first terminal is not received from the other terminals of the group, the communicator 2210 according to an embodiment may transmit the transmission authority acceptance message.

Moreover, the communicator 2210 according to an embodiment may transmit the transmission authority acceptance message to the first terminal having a priority higher than that of a second terminal. According to another embodiment, the communicator 2210 may transmit the transmission authority acceptance message to the first terminal having a random value greater than that of the second terminal.

The communicator 2210 may transmit the transmission authority request message to each of the other terminals of the group in the middle of receiving the media data from the first terminal having a transmission authority among the other terminals of the group including the terminal 2200. Also, the communicator 2210 may receive a transmission authority request acceptance message from the first terminal.

Moreover, the communicator 2210 may transmit the media data, based on a result obtained by determining whether the media data of the first terminal is received.

According to an embodiment, when the media data of the first terminal is not received for a certain time, the communicator 2210 may retransmit the transmission authority request message to the first terminal. When the transmission authority request acceptance message is retransmitted within a certain time after retransmitting the transmission authority request message, the communicator 2210 may transmit the media data.

A priority of the terminal 2200 may be the highest in priorities of one or more terminals which have requested a transmission authority from the first terminal, and when the media data of the first terminal is not received for a certain time, the communicator 2210 according to an embodiment may retransmit the transmission authority request message.

When a transmission release message is received from the first terminal, the communicator 2210 according to an embodiment may transmit the media data to each of the other terminals. Also, the communicator 2210 may receive the transmission release message from the first terminal, and when the priority of the terminal 2200 is the highest in priorities of the one or more terminals which have requested the transmission authority, the communicator 2210 may transmit the media data to each of the other terminals.

The controller 2220 may implement a proposed function, operation, and/or method. The above-described operation of the terminal 2200 may be implemented by the controller 2220.

The controller 2220 may determine whether the transmission authority acceptance message is received from another terminal of the group.

The controller 2220 according to an embodiment may monitor whether the transmission authority request message of another terminal is received for a certain time from a time when the transmission authority request message of the first terminal is received. Also, when the transmission authority request message of the other terminal is not received, the controller 2220 may determine the first terminal as a terminal having the transmission authority.

Moreover, when the transmission authority request message is received from a second terminal of the other terminals of the group, the controller 2220 may compare a priority of the first terminal with a priority of the second terminal to determine a terminal having the transmission authority.

Moreover, when the transmission authority request message is received from the second terminal of the other terminals of the group, the controller 2220 may compare random values respectively generated from the first and second terminals to determine the terminal having the transmission authority.

The controller 2220 according to an embodiment may determine whether the media data of the first terminal is received. Also, the controller 2220 may determine whether the priority of the terminal 2200 is the highest in priorities of the one or more terminals which have requested the transmission authority from the first terminal. The controller 2220 may update transmission authority status information about the terminal 2200, based on information about the one or more terminals which have requested the transmission authority from the first terminal.

The memory 2230 may be connected to the controller 2220 and may store a protocol or a parameter for an operation. For example, the memory 2230 may store at least one of queue information and transmission authority status information about terminals requesting the transmission authority.

Figure 23:
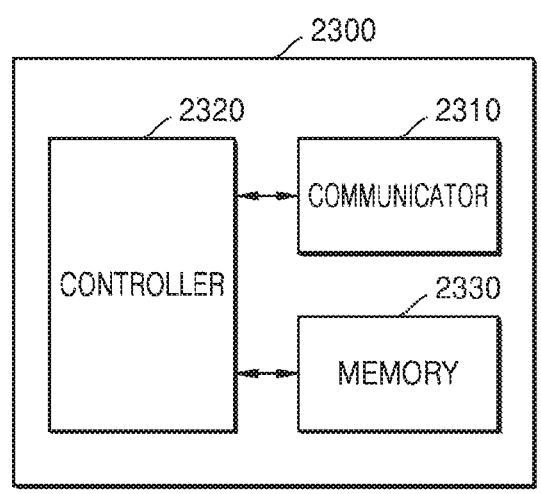
FIG. 23 is a block diagram of a first terminal according to an embodiment.

FIG. 23 is a block diagram of a first terminal 2300 according to an embodiment.

Referring to FIG. 23, the first terminal 2300 according to an embodiment may include a communicator 2310, a controller 2320, and a memory 2330.

The first terminal 2300 of FIG. 23 is illustrated as including only elements associated with the present embodiment. Therefore, it may be understood by one of ordinary skill in the art that the first terminal 2300 may further include general-use elements in addition to the elements of FIG. 23.

The communicator 2310 may transmit a transmission authority request message to each of other terminals included in a group including the first terminal 2300. When a standby time which is randomly determined in each of the other terminals of the group elapses, the communicator 2310 may receive a transmission authority acceptance message from at least one of the other terminals of the group.

The communicator 2310 according to an embodiment may receive the transmission authority request message of another terminal of the group within a certain time after the transmission authority request message is received.

Moreover, the communicator 2310 may receive the transmission authority request message from another terminal of the group in the middle of transmitting media data, and when the transmission of the media data ends, the communicator 2310 may transmit a transmission release message to each of the other terminals of the group.

The communicator 2310 according to an embodiment may transmit a transmission authority acceptance message to another terminal and may receive media data of the other terminal from the other terminal.

Moreover, the communicator 2310 may transmit a transmission authority request acceptance message, including information about a transmission authority status determined for at least one terminal which has requested a transmission authority from the first terminal 2300, to each of the other terminals of the group.

The controller 2320 may implement a proposed function, operation, and/or method. The above-described operation of the first terminal 2300 may be implemented by the controller 2320.

The controller 2320 may determine whether the transmission authority acceptance message is received from at least one of the other terminals of the group.

Moreover, the controller 2320 may receive the transmission authority request message from another terminal of the group in the middle of transmitting media data, and when a priority of the other terminal is higher than that of the first terminal 2300, the controller 2320 may stop the transmission of the media data.

The controller 2320 according to an embodiment may determine a transmission authority status of at least one terminal, based on a priority of the at least one terminal.

The memory 2330 may be connected to the controller 2320 and may store a protocol or a parameter for an operation. For example, the memory 2330 may store at least one of queue information and transmission authority status information about terminals requesting the transmission authority.

An apparatus according to the inventive concept may include a processor, a memory storing and executing program data, a permanent storage such as a disk drive, a communication port for communication with an external device, a user interface device such as a touch panel, keys or buttons, and the like. Methods embodied as a software module or an algorithm may be stored on a computer-readable recording medium as computer readable codes or program commands executable by the processor. Examples of the computer-readable recording medium include magnetic storage media (e.g., ROM, floppy disks, hard disks, etc.), optical recording media (e.g., CD-ROMs, or DVDs), and the like. The computer-readable recording medium may also be distributed over network-coupled computer systems so that the computer readable code is stored and executed in a distributed fashion. The medium may be read by a computer, stored in a memory, and executed by the processor.

All the documents including the public laid open documents, patent applications, patent documents, and the like cited in the inventive concept may be merged into the inventive concept in the same manner as that indicated by individually or specifically merging the respective cited documents or as that indicated by merging them overall in the inventive concept.

To aid in understanding the inventive concept, reference numerals are used in the exemplary embodiments shown in the drawings, and specific terms are used to explain the exemplary embodiments of the inventive concept; however, they are not intended to limit the inventive concept and may represent all the components that could be considered by those of ordinary skill in the art.

The inventive concept may be embodied as functional blocks and various processing operations. The functional blocks may be implemented with various hardware and/or software configurations executing specific functions. For example, the inventive concept employs integrated circuit configurations such as a memory, processing, logic, a look-up table and the like capable of executing various functions upon control of microprocessors or other control devices. In a similar manner to that in which the elements of the inventive concept may be executed with software programming or software elements, the inventive concept may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, the inventive concept may employ conversional arts to establish an electronic environment, process signals and/or process data. The terms "mechanism", "element", "means" and "configuration" may be widely used and are not limited to mechanical and physical configurations. Such terms may have the meaning of a series of routines of software in association with a processor or the like.

Specific executions described herein are merely examples and do not limit the scope of the inventive concept in any way. For simplicity of description, other functional aspects of conventional electronic configurations, control systems, software and the systems may be omitted. Furthermore, line connections or connection members between elements depicted in the drawings represent functional connections and/or physical or circuit connections by way of example, and in actual applications, they may be replaced or embodied as various additional functional connection, physical connection or circuit connections. Also, the described elements may not be inevitably required elements for the application of the inventive concept unless they are specifically mentioned as being "essential" or "critical."

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A terminal comprising:
a communicator configured to receive media data of a first terminal arbitrating a transmission authority among other terminals, transmit a transmission authority request message to each of the other terminals in response to an expiry of a first timer based on receiving the media data; and
a controller configured to enter a permission state in response to a Nth expiry of a second timer started upon transmitting the transmission authority request message,
wherein in the permission state, the terminal has permission to transmit media data of the terminal.

2. The terminal of claim 1, wherein if a priority of the terminal is highest among the one or more terminals requesting the transmission authority request message, the communicator transmits the media data of the terminal.

3. The terminal of claim 1, wherein the controller transmits the media data of the terminal if a transmission authority request acceptance message is not received within a certain time after retransmitting the transmission authority request message and the transmission authority request acceptance message comprises information about other terminals which have requested the transmission authority from the first terminal.

4. The terminal of claim 3, wherein the controller updates transmission authority status information about the terminal, based on the information about other terminals which have requested the transmission authority from the first terminal.

5. The terminal of claim 1, wherein if a transmission release message is received from the first terminal, the communicator transmits the media data to each of the other terminals of a group.

6. The terminal of claim 5, wherein the communicator receives the transmission release message from the first terminal, and if a priority of the terminal is highest in priorities of one or more terminals requesting the transmission authority, the communicator transmits the media data to each of the other terminals of a group.

7. A communication method between terminals, the communication method comprising:
receiving, by a terminal, media data of a first terminal arbitrating a transmission authority among other terminals;
transmitting a transmission authority request message to each of the other terminals in response to an expiry of a first timer based on receiving the media data; and entering a permission state in response to a Nth expiry of a second timer started upon transmitting the transmission authority request message, wherein in the permission state, the terminal has permission to transmit media data of the terminal.

8. The communication method of claim 7, wherein the transmitting of the media data of the terminal comprises transmitting the media data of the terminal if a priority of the terminal is highest among the one or more terminals requesting the transmission authority message.

9. The communication method of claim 7, further comprising: transmitting the media data of the terminal if a transmission authority request acceptance message is not received within a certain time after retransmitting the transmission authority request message and the transmission authority request acceptance message comprises information about other terminals which have requested the transmission authority from the first terminal.

10. The communication method of claim 9, further comprising: updating transmission authority status information about the terminal, based on the information about other terminals which have requested the transmission authority from the first terminal.

11. The communication method of claim 7, wherein the transmitting of the media data comprises, if a transmission release message is received from the first terminal, transmitting the media data to each of the other terminals of a group.

12. The communication method of claim 11, further comprising:

receiving the transmission release message from the first terminal; and determining whether a priority of the terminal is highest in priorities of one or more terminals requesting the transmission authority, wherein the transmitting of the media data comprises, if the priority of the terminal is highest, transmitting the media data to each of the other terminals of a group.

* * * * *